(12) United States Patent
Coley et al.

(10) Patent No.: US 8,510,226 B2
(45) Date of Patent: Aug. 13, 2013

(54) METHOD FOR SYNCHRONOUS ENCRYPTION BETWEEN A CLIENT AND A LICENSING AGENT

(75) Inventors: Christopher D. Coley, Morgan Hill, CA (US); Ralph E. Wesinger, Livermore, CA (US)

(73) Assignee: GraphOn Corporation, Campbell, CA (US)

(*) Notice: Subject to any disclaimer, the term of this patent is extended or adjusted under 35 U.S.C. 154(b) by 894 days.

(21) Appl. No.: 11/621,734

(22) Filed: Jan. 10, 2007

(65) Prior Publication Data

US 2007/0198429 A1 Aug. 23, 2007

Related U.S. Application Data

(60) Division of application No. 11/119,373, filed on Apr. 29, 2005, which is a continuation of application No. 10/079,221, filed on Feb. 19, 2002, which is a continuation of application No. 09/128,652, filed on Aug. 4, 1998, now abandoned, which is a continuation of application No. 08/607,081, filed on Feb. 26, 1996, now Pat. No. 5,790,664.

(51) Int. Cl.
*G06F 21/00* (2006.01)
*G06F 15/16* (2006.01)

(52) U.S. Cl.
USPC .......... 705/59; 705/51; 705/52; 705/53; 705/54; 705/55; 705/56; 705/57; 705/58; 709/200; 709/201; 709/202; 709/203; 709/204

(58) Field of Classification Search
USPC .......... 709/200–204; 705/1, 51–55
See application file for complete search history.

(56) References Cited

U.S. PATENT DOCUMENTS

| | | | |
|---|---|---|---|
| 3,573,747 A | 4/1971 | Adams et al. | |
| 3,609,697 A | 9/1971 | Blevins et al. | |
| 3,796,830 A | 3/1974 | Smith | |
| 3,798,359 A | 3/1974 | Feistel | |
| 3,798,360 A | 3/1974 | Feistel | |

(Continued)

FOREIGN PATENT DOCUMENTS

| | | |
|---|---|---|
| BE | 9 004 79 | 12/1984 |
| DE | 3803982 A1 | 1/1990 |

(Continued)

OTHER PUBLICATIONS

Co-pending U.S. Appl. No. 10/371,759, filed Feb. 20, 2003 entitled Automated System for Management of Licensed Digital Assets.

(Continued)

*Primary Examiner* — Calvin Loyd Hewitt, II
*Assistant Examiner* — Cristina Owen Sherr
(74) *Attorney, Agent, or Firm* — Lewis and Roca LLP

(57) ABSTRACT

A licensing system is disclosed for performing synchronous encryption with a client over an IP-compliant network. In disclosed embodiments, the system includes a licensing agent configured to pass a data structure unencrypted in an initial communication between the licensing agent/client pair and pass a first key to said client responsive to an initial communication. The licensing agent then receives the data structure from the client having designated fields encrypted according to the first key. The licensing agent then sends a second key to the client for use in subsequent communications.

6 Claims, 7 Drawing Sheets

(56) References Cited

U.S. PATENT DOCUMENTS

| | | |
|---|---|---|
| 3,798,605 A | 3/1974 | Feistel |
| 3,806,882 A | 4/1974 | Clarke |
| 3,829,833 A | 8/1974 | Freeny, Jr. |
| 3,906,448 A | 9/1975 | Henriques |
| 3,911,397 A | 10/1975 | Freeny, Jr. |
| 3,924,065 A | 12/1975 | Freeny, Jr. |
| 3,931,504 A | 1/1976 | Jacoby |
| 3,946,220 A | 3/1976 | Brobeck et al. |
| 3,956,615 A | 5/1976 | Anderson et al. |
| 3,958,081 A | 5/1976 | Ehrsam et al. |
| 3,970,992 A | 7/1976 | Boothroyd et al. |
| 4,048,619 A | 9/1977 | Forman, Jr. et al. |
| 4,071,911 A | 1/1978 | Mazur |
| 4,112,421 A | 9/1978 | Freeny, Jr. |
| 4,120,030 A | 10/1978 | Johnstone |
| 4,163,280 A | 7/1979 | Mori et al. |
| 4,168,396 A | 9/1979 | Best |
| 4,196,310 A | 4/1980 | Forman et al. |
| 4,200,913 A | 4/1980 | Kuhar et al. |
| 4,209,787 A | 6/1980 | Freeny, Jr. |
| 4,217,588 A | 8/1980 | Freeny, Jr. |
| 4,220,991 A | 9/1980 | Hamano et al. |
| 4,232,193 A | 11/1980 | Gerard |
| 4,232,317 A | 11/1980 | Freeny, Jr. |
| 4,236,217 A | 11/1980 | Kennedy |
| 4,253,157 A | 2/1981 | Kirschner et al. |
| 4,262,329 A | 4/1981 | Bright et al. |
| 4,265,371 A | 5/1981 | Desai et al. |
| 4,270,182 A | 5/1981 | Asija |
| 4,278,837 A | 7/1981 | Best |
| 4,305,131 A | 12/1981 | Best |
| 4,306,289 A | 12/1981 | Lumley |
| 4,309,569 A | 1/1982 | Merkle |
| 4,319,079 A | 3/1982 | Best |
| 4,328,544 A | 5/1982 | Baldwin et al. |
| 4,337,483 A | 6/1982 | Guillou |
| 4,361,877 A | 11/1982 | Dyer et al. |
| 4,375,579 A | 3/1983 | Davida et al. |
| 4,433,207 A | 2/1984 | Best |
| 4,434,464 A | 2/1984 | Suzuki et al. |
| 4,442,486 A | 4/1984 | Mayer |
| 4,446,519 A | 5/1984 | Thomas |
| 4,454,594 A | 6/1984 | Heffron et al. |
| 4,458,315 A | 7/1984 | Uchenick |
| 4,462,076 A | 7/1984 | Smith, III |
| 4,462,078 A | 7/1984 | Ross |
| 4,465,901 A | 8/1984 | Best |
| 4,471,163 A | 9/1984 | Donald et al. |
| 4,484,217 A | 11/1984 | Block et al. |
| 4,494,156 A | 1/1985 | Kadison et al. |
| 4,513,174 A | 4/1985 | Herman |
| 4,528,588 A | 7/1985 | Lofberg |
| 4,528,643 A | 7/1985 | Freeny, Jr. |
| 4,553,252 A | 11/1985 | Egendorf |
| 4,558,176 A | 12/1985 | Arnold et al. |
| 4,558,413 A | 12/1985 | Schmidt et al. |
| 4,562,306 A | 12/1985 | Chou et al. |
| 4,562,495 A | 12/1985 | Bond et al. |
| 4,577,289 A | 3/1986 | Comerford et al. |
| 4,584,641 A | 4/1986 | Guglielmino |
| 4,588,991 A | 5/1986 | Atalla |
| 4,589,064 A | 5/1986 | Chiba et al. |
| 4,593,353 A | 6/1986 | Pickholtz |
| 4,593,376 A | 6/1986 | Volk |
| 4,595,950 A | 6/1986 | Lofberg |
| 4,597,058 A | 6/1986 | Izumi et al. |
| 4,634,807 A | 1/1987 | Chorley et al. |
| 4,644,493 A | 2/1987 | Chandra et al. |
| 4,646,234 A | 2/1987 | Tolman et al. |
| 4,652,990 A | 3/1987 | Pailen et al. |
| 4,658,093 A | 4/1987 | Hellman |
| 4,670,857 A | 6/1987 | Rackman |
| 4,672,572 A | 6/1987 | Alsberg |
| 4,677,434 A | 6/1987 | Fascenda |
| 4,680,731 A | 7/1987 | Izumi et al. |
| 4,683,553 A | 7/1987 | Mollier |
| 4,685,056 A | 8/1987 | Barnsdale, Jr. et al. |
| 4,688,169 A | 8/1987 | Joshi |
| 4,691,350 A | 9/1987 | Kleijne et al. |
| 4,696,034 A | 9/1987 | Wiedemer |
| 4,701,846 A | 10/1987 | Ikeda et al. |
| 4,712,238 A | 12/1987 | Gilhousen et al. |
| 4,713,753 A | 12/1987 | Boebert et al. |
| 4,740,890 A | 4/1988 | William |
| 4,747,139 A | 5/1988 | Taafee |
| 4,768,087 A | 8/1988 | Taub et al. |
| 4,791,565 A | 12/1988 | Dunham et al. |
| 4,796,181 A | 1/1989 | Wiedemer |
| 4,799,156 A | 1/1989 | Shavit et al. |
| 4,807,288 A | 2/1989 | Ugon et al. |
| 4,817,140 A | 3/1989 | Chandra et al. |
| 4,823,264 A | 4/1989 | Deming |
| 4,827,508 A | 5/1989 | Shear |
| 4,858,121 A | 8/1989 | Barber et al. |
| 4,864,494 A | 9/1989 | Kobus, Jr. |
| 4,868,877 A | 9/1989 | Fischer |
| 4,888,798 A | 12/1989 | Earnest |
| 4,903,296 A | 2/1990 | Chandra et al. |
| 4,924,378 A | 5/1990 | Hershey et al. |
| 4,930,073 A | 5/1990 | Cina, Jr. |
| 4,937,863 A | 6/1990 | Robert et al. |
| 4,949,187 A | 8/1990 | Cohen |
| 4,977,594 A | 12/1990 | Shear |
| 4,999,806 A | 3/1991 | Chernow et al. |
| 5,001,752 A | 3/1991 | Fischer |
| 5,005,122 A | 4/1991 | Griffin et al. |
| 5,005,200 A | 4/1991 | Fischer |
| 5,010,571 A | 4/1991 | Katznelson |
| 5,023,907 A | 6/1991 | Johnson et al. |
| 5,047,928 A | 9/1991 | Wiedemer |
| 5,048,085 A | 9/1991 | Abraham et al. |
| 5,050,213 A | 9/1991 | Shear |
| 5,091,966 A | 2/1992 | Bloomberg et al. |
| 5,103,392 A | 4/1992 | Mori |
| 5,103,476 A | 4/1992 | Waite et al. |
| 5,111,390 A | 5/1992 | Ketcham |
| 5,119,493 A | 6/1992 | Janis et al. |
| 5,128,525 A | 7/1992 | Stearns et al. |
| 5,136,643 A | 8/1992 | Fischer |
| 5,136,646 A | 8/1992 | Haber et al. |
| 5,136,647 A | 8/1992 | Haber et al. |
| 5,136,716 A | 8/1992 | Harvey et al. |
| 5,138,712 A | 8/1992 | Corbin |
| 5,146,575 A | 9/1992 | Nolan, Jr. |
| 5,148,481 A | 9/1992 | Abraham et al. |
| 5,155,680 A | 10/1992 | Wiedemer |
| 5,168,147 A | 12/1992 | Bloomberg |
| 5,185,717 A | 2/1993 | Mori |
| 5,201,046 A | 4/1993 | Goldberg et al. |
| 5,201,047 A | 4/1993 | Maki et al. |
| 5,204,897 A | 4/1993 | Wyman |
| 5,208,748 A | 5/1993 | Flores et al. |
| 5,214,702 A | 5/1993 | Fischer |
| 5,216,603 A | 6/1993 | Flores et al. |
| 5,221,833 A | 6/1993 | Hecht |
| 5,222,134 A | 6/1993 | Waite et al. |
| 5,224,160 A | 6/1993 | Paulini et al. |
| 5,224,163 A | 6/1993 | Gasser et al. |
| 5,235,642 A | 8/1993 | Wobber et al. |
| 5,245,165 A | 9/1993 | Zhang |
| 5,260,999 A | 11/1993 | Wyman |
| 5,263,158 A | 11/1993 | Janis |
| 5,265,164 A | 11/1993 | Matyas et al. |
| 5,276,735 A | 1/1994 | Boebert et al. |
| 5,280,479 A | 1/1994 | Mary |
| 5,282,186 A | 1/1994 | Yoshio et al. |
| 5,285,494 A | 2/1994 | Sprecher et al. |
| 5,301,231 A | 4/1994 | Abraham et al. |
| 5,311,591 A | 5/1994 | Fischer |
| 5,319,705 A | 6/1994 | Halter et al. |
| 5,337,360 A | 8/1994 | Fischer |
| 5,341,429 A | 8/1994 | Stringer et al. |
| 5,343,527 A | 8/1994 | Moore |
| 5,347,579 A | 9/1994 | Blandford |

| | | | | | | |
|---|---|---|---|---|---|---|
| 5,351,293 A | 9/1994 | Michener et al. | 5,640,546 A | 6/1997 | Gopinath et al. | |
| 5,355,474 A | 10/1994 | Thuraisngham et al. | 5,655,077 A | 8/1997 | Jones et al. | |
| 5,367,635 A | 11/1994 | Bauer | 5,664,109 A | 9/1997 | Johnson et al. | |
| 5,373,561 A | 12/1994 | Haber et al. | 5,671,412 A | 9/1997 | Christiano | |
| 5,375,055 A | 12/1994 | Togher et al. | 5,687,236 A | 11/1997 | Moskowitz et al. | |
| 5,375,206 A | 12/1994 | Hunter et al. | 5,689,587 A | 11/1997 | Bender et al. | |
| 5,390,247 A | 2/1995 | Fischer | 5,692,180 A | 11/1997 | Lee | |
| 5,390,297 A | 2/1995 | Barber et al. | 5,699,528 A | 12/1997 | Hogan | |
| 5,390,330 A | 2/1995 | Talati | 5,708,709 A | 1/1998 | Rose | |
| 5,392,220 A | 2/1995 | van den Hamer et al. | 5,710,834 A | 1/1998 | Rhoads | |
| 5,392,390 A | 2/1995 | Crozier | 5,717,604 A | 2/1998 | Wiggins | |
| 5,394,469 A | 2/1995 | Nagel et al. | 5,732,219 A | 3/1998 | Blumer et al. | |
| 5,410,598 A | 4/1995 | Shear | 5,740,549 A | 4/1998 | Reilly et al. | |
| 5,412,717 A | 5/1995 | Fischer | 5,742,598 A | 4/1998 | Dunn et al. | |
| 5,416,842 A * | 5/1995 | Aziz ........................... 713/151 | 5,745,604 A | 4/1998 | Rhoads | |
| 5,421,006 A | 5/1995 | Jablon et al. | 5,748,763 A | 5/1998 | Rhoads | |
| 5,422,953 A | 6/1995 | Fischer | 5,748,783 A | 5/1998 | Rhoads | |
| 5,426,421 A | 6/1995 | Gray | 5,748,960 A | 5/1998 | Fischer | |
| 5,428,606 A | 6/1995 | Moskowitz | 5,752,041 A | 5/1998 | Fosdick | |
| 5,432,907 A | 7/1995 | Picazo, Jr. et al. | 5,754,849 A | 5/1998 | Dyer et al. | |
| 5,438,508 A | 8/1995 | Wyman | 5,757,914 A | 5/1998 | McManis | |
| 5,442,645 A | 8/1995 | Ugon et al. | 5,758,069 A | 5/1998 | Olsen | |
| 5,444,779 A | 8/1995 | Daniele | 5,758,152 A | 5/1998 | LeTourneau | |
| 5,449,895 A | 9/1995 | Hecht et al. | 5,765,152 A * | 6/1998 | Erickson ................ | 707/999.009 |
| 5,449,896 A | 9/1995 | Hecht et al. | 5,768,426 A | 6/1998 | Rhoads | |
| 5,450,493 A | 9/1995 | Maher | 5,790,664 A | 8/1998 | Wesinger, Jr. et al. | |
| 5,453,601 A | 9/1995 | Rosen | 5,796,941 A | 8/1998 | Lita | |
| 5,453,605 A | 9/1995 | Hecht et al. | 5,845,065 A | 12/1998 | Conte et al. | |
| 5,455,407 A | 10/1995 | Rosen | 5,870,550 A | 2/1999 | Wesinger, Jr. et al. | |
| 5,455,861 A | 10/1995 | Faucher et al. | 5,870,552 A | 2/1999 | Dozier et al. | |
| 5,455,953 A | 10/1995 | Russell | 5,884,309 A | 3/1999 | Vanechanos, Jr. | |
| 5,457,736 A | 10/1995 | Cain et al. | 5,892,900 A * | 4/1999 | Ginter et al. ................... | 726/26 |
| 5,457,746 A | 10/1995 | Dolphin | 5,893,910 A | 4/1999 | Martineau et al. | |
| 5,463,565 A | 10/1995 | Cookson et al. | 5,898,830 A | 4/1999 | Wesinger, Jr. et al. | |
| 5,473,687 A | 12/1995 | Lipscomb et al. | 5,910,987 A | 6/1999 | Ginter et al. | |
| 5,473,692 A | 12/1995 | Davis | 5,915,019 A | 6/1999 | Ginter et al. | |
| 5,479,509 A | 12/1995 | Ugon | 5,917,912 A | 6/1999 | Ginter et al. | |
| 5,483,658 A | 1/1996 | Grube | 5,925,127 A | 7/1999 | Ahmad | |
| 5,485,622 A | 1/1996 | Yamaki | 5,949,876 A | 9/1999 | Ginter et al. | |
| 5,491,750 A * | 2/1996 | Bellare et al. ................ 713/155 | 5,982,891 A | 11/1999 | Ginter et al. | |
| 5,491,800 A | 2/1996 | Goldsmith et al. | 6,009,401 A | 12/1999 | Horstmann | |
| 5,495,411 A | 2/1996 | Ananda | 6,049,789 A | 4/2000 | Frison et al. | |
| 5,497,479 A | 3/1996 | Hornbuckle | 6,052,788 A | 4/2000 | Wesinger, Jr. et al. | |
| 5,497,491 A | 3/1996 | Mitchell et al. | 6,056,786 A | 5/2000 | Rivera et al. | |
| 5,499,298 A | 3/1996 | Narasimhalu et al. | 6,181,867 B1 | 1/2001 | Kenner et al. | |
| 5,504,757 A | 4/1996 | Cook et al. | 6,185,683 B1 | 2/2001 | Ginter et al. | |
| 5,504,818 A | 4/1996 | Okano | 6,189,146 B1 | 2/2001 | Misra et al. | |
| 5,504,837 A | 4/1996 | Griffeth et al. | 6,237,786 B1 | 5/2001 | Ginter et al. | |
| 5,508,913 A | 4/1996 | Yamamoto et al. | 6,249,291 B1 | 6/2001 | Popp et al. | |
| 5,509,070 A | 4/1996 | Schull | 6,253,193 B1 | 6/2001 | Ginter et al. | |
| 5,513,261 A | 4/1996 | Maher | 6,289,452 B1 | 9/2001 | Arnold et al. | |
| 5,530,235 A | 6/1996 | Stefik et al. | 6,363,488 B1 | 3/2002 | Ginter et al. | |
| 5,530,752 A | 6/1996 | Rubin | 6,385,596 B1 | 5/2002 | Wiser et al. | |
| 5,533,123 A | 7/1996 | Force et al. | 6,389,402 B1 | 5/2002 | Ginter et al. | |
| 5,534,975 A | 7/1996 | Stefik et al. | 6,427,140 B1 | 7/2002 | Ginter et al. | |
| 5,537,526 A | 7/1996 | Anderson et al. | 6,466,209 B1 | 10/2002 | Bantum | |
| 5,539,735 A | 7/1996 | Moskowitz | 6,640,304 B2 | 10/2003 | Ginter et al. | |
| 5,539,828 A | 7/1996 | Davis | 6,647,422 B2 | 11/2003 | Wesinger, Jr. et al. | |
| 5,548,645 A | 8/1996 | Ananda | 6,658,568 B1 | 12/2003 | Ginter et al. | |
| 5,550,971 A | 8/1996 | Brunner et al. | 6,893,910 B1 | 5/2005 | Woo et al. | |
| 5,553,282 A | 9/1996 | Parrish et al. | 7,047,241 B1 | 5/2006 | Erickson | |
| 5,557,518 A | 9/1996 | Rosen | 2002/0154157 A1 | 10/2002 | Sherr et al. | |
| 5,563,937 A | 10/1996 | Bruno et al. | 2005/0251489 A1 | 11/2005 | Coley et al. | |
| 5,563,946 A | 10/1996 | Cooper et al. | 2005/0251490 A1 | 11/2005 | Coley et al. | |
| 5,568,552 A | 10/1996 | Davis | 2005/0273435 A1 | 12/2005 | Coley et al. | |
| 5,572,221 A | 11/1996 | Marlevi et al. | 2005/0273436 A1 | 12/2005 | Coley et al. | |
| 5,572,673 A | 11/1996 | Shurts | 2005/0273437 A1 | 12/2005 | Coley et al. | |
| 5,579,222 A | 11/1996 | Bains et al. | 2005/0289074 A1 | 12/2005 | Coley et al. | |
| 5,592,549 A | 1/1997 | Nagel et al. | 2006/0106730 A1 | 5/2006 | Coley et al. | |
| 5,596,723 A | 1/1997 | Romohr | 2006/0106731 A1 | 5/2006 | Coley et al. | |
| 5,606,609 A | 2/1997 | Houser et al. | 2006/0106732 A1 | 5/2006 | Coley et al. | |
| 5,613,004 A | 3/1997 | Cooperman et al. | 2006/0106733 A1 | 5/2006 | Coley et al. | |
| 5,621,797 A | 4/1997 | Rosen | 2006/0122940 A1 | 6/2006 | Coley et al. | |
| 5,629,980 A | 5/1997 | Stefik et al. | 2006/0122941 A1 | 6/2006 | Coley et al. | |
| 5,633,932 A | 5/1997 | Davis et al. | 2006/0136343 A1 | 6/2006 | Coley et al. | |
| 5,634,012 A | 5/1997 | Stefik et al. | 2006/0242075 A1 | 10/2006 | Ginter et al. | |
| 5,636,292 A | 6/1997 | Rhoads | 2006/0265336 A1 | 11/2006 | Wesinger | |
| 5,638,443 A | 6/1997 | Stefik et al. | 2006/0265337 A1 | 11/2006 | Wesinger, Jr. | |
| 5,638,504 A | 6/1997 | Scott et al. | 2007/0112684 A1 | 5/2007 | Coley et al. | |

| | | | |
|---|---|---|---|
| 2007/0130081 A1 | 6/2007 | Coley et al. | |
| 2007/0130082 A1 | 6/2007 | Coley et al. | |
| 2007/0198429 A1 | 8/2007 | Coley et al. | |

FOREIGN PATENT DOCUMENTS

| | | |
|---|---|---|
| EP | 0 084 441 A2 | 7/1983 |
| EP | 0 128 672 A1 | 12/1984 |
| EP | 0 135 442 A1 | 3/1985 |
| EP | 0 180 460 A1 | 7/1986 |
| EP | 0 370 146 A1 | 5/1990 |
| EP | 0 180 460 B1 | 9/1990 |
| EP | 0 399 822 A2 | 11/1990 |
| EP | 0 421 409 A2 | 4/1991 |
| EP | 0 456 386 A2 | 11/1991 |
| EP | 0 469 864 A2 | 2/1992 |
| EP | 0 399 822 A3 | 5/1992 |
| EP | 0 565 314 A2 | 10/1993 |
| EP | 0 593 305 A2 | 4/1994 |
| EP | 0 651 554 A1 | 5/1995 |
| EP | 0 593 305 A3 | 7/1995 |
| EP | 0 695 985 A1 | 7/1995 |
| EP | 0 668 695 A2 | 8/1995 |
| EP | 0 715 243 A1 | 11/1995 |
| EP | 0 696 798 A1 | 2/1996 |
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| EP | 0 725 376 A2 | 8/1996 |
| EP | 0 749 081 A1 | 12/1996 |
| EP | 0 778 513 A2 | 6/1997 |
| EP | 0 795 873 A2 | 9/1997 |
| GB | 2 136 175 A | 9/1984 |
| GB | 2 264 796 A | 9/1993 |
| GB | 2 294 348 A | 4/1996 |
| GB | 2 295 947 A | 6/1996 |
| JP | 57-000726 | 1/1982 |
| JP | 62-241061 | 10/1987 |
| JP | 02-242352 | 3/1989 |
| JP | 64-068835 | 3/1989 |
| JP | 02-247763 | 10/1990 |
| JP | 02-294855 | 12/1990 |
| JP | 04-369068 | 12/1992 |
| JP | 05-181734 | 7/1993 |
| JP | 05-257783 | 10/1993 |
| JP | 05-268415 | 10/1993 |
| JP | 06-175794 | 6/1994 |
| JP | 06-215010 | 8/1994 |
| JP | 07-056794 | 3/1995 |
| JP | 07-084852 | 3/1995 |
| JP | 07-141138 | 6/1995 |
| JP | 07-200317 | 8/1995 |
| JP | 07-200492 | 8/1995 |
| JP | 07-244639 | 9/1995 |
| JP | 08-137795 | 5/1996 |
| JP | 08-152990 | 6/1996 |
| JP | 08-185298 | 7/1996 |
| WO | WO 85/02310 A1 | 5/1985 |
| WO | WO 85/03584 A1 | 8/1985 |
| WO | WO 90/02382 A1 | 3/1990 |
| WO | WO 92/06438 A1 | 4/1992 |
| WO | WO 92/22870 A1 | 12/1992 |
| WO | WO 93/01550 A1 | 1/1993 |
| WO | WO 94/01821 A1 | 1/1994 |
| WO | WO 94/03859 A1 | 2/1994 |
| WO | WO 94/06103 A1 | 3/1994 |
| WO | WO 94/16395 A1 | 7/1994 |
| WO | WO 94/18620 A1 | 8/1994 |
| WO | WO 94/22266 A1 | 9/1994 |
| WO | WO 94/27406 A2 | 11/1994 |
| WO | WO 95/14289 A2 | 5/1995 |
| WO | WO 95/14289 A3 | 6/1995 |
| WO | WO 96/00963 A1 | 1/1996 |
| WO | WO 96/03835 A1 | 2/1996 |
| WO | WO 96/05698 A1 | 2/1996 |
| WO | WO 96/06503 A1 | 2/1996 |
| WO | WO 96/13013 A1 | 5/1996 |
| WO | WO 96/21192 A1 | 7/1996 |
| WO | WO 97/03423 A1 | 1/1997 |
| WO | WO 97/07656 A2 | 3/1997 |
| WO | WO 97/32251 A1 | 9/1997 |
| WO | WO 97/48203 A1 | 12/1997 |

OTHER PUBLICATIONS

Co-pending U.S. Appl. No. 09/128,652, filed Aug. 4, 1998 entitled Automated System for Management of Licensed Software.
Co-pending U.S. Appl. No. 10/079,221, filed Feb. 19, 2002 entitled Automated System for Management of Licensed Software.
Co-pending U.S. Appl. No. 11/297,208, filed Dec. 7, 2005 entitled Method for Purchasing a Software License Over a Public Network.
Co-pending U.S. Appl. No. 11/297,206, filed Dec. 7, 2005 entitled Downloadable Software Package Incorporating License Management Software.
Co-pending U.S. Appl. No. 10/607,196, filed Jun. 24, 2003 entitled Automated System for Management of Licensed Software and abandoned.
Copyright Registration for Computer Programs, Circular 61, Rev:Jul. 2008, United States Copyright Office, http://www.copyright.gov/circs/circ61.pdf, 5 pages.
Office Action mailed Sep. 28, 2005 in copending U.S. Appl. No. 11/119,373 entitled Method for Synchronous Encryption Between a Client and a Licensing Agent, filed Apr. 29, 2005, 7 pages.
Office Action mailed Jan. 17, 2006 in copending U.S. Appl. No. 11/119,373 entitled Method for Synchronous Encryption Between a Client and a Licensing Agent, filed Apr. 29, 2005, 13 pages.
Office Action for restriction mailed Oct. 4, 2006 in copending U.S. Appl. No. 11/119,373 entitled Method for Synchronous Encryption Between a Client and a Licensing Agent, filed Apr. 29, 2005, 7 pages.
Office Action mailed Jan. 16, 2007 in copending U.S. Appl. No. 11/119,373 entitled Method for Synchronous Encryption Between a Client and a Licensing Agent, filed Apr. 29, 2005, 38 pages.
Office Action mailed Oct. 2, 2007 in copending U.S. Appl. No. 11/119,373 entitled Method for Synchronous Encryption Between a Client and a Licensing Agent, filed Apr. 29, 2005, 8 pages.
Office Action mailed Aug. 25, 2008 in copending U.S. Appl. No. 11/119,373 entitled Method for Synchronous Encryption Between a Client and a Licensing Agent, filed Apr. 29, 2005, 28 pages.
Final Office Action mailed Mar. 13, 2009 in copending U.S. Appl. No. 11/119,373 entitled Method for Synchronous Encryption Between a Client and a Licensing Agent, filed Apr. 29, 2005, 14 pages.
Office Action mailed Dec. 30, 2010 in copending U.S. Appl. No. 11/119,373 entitled Method for Synchronous Encryption Between a Client and a Licensing Agent, filed Apr. 29, 2005, 7 pages.
Office Action for U.S. Appl. No. 08/607,031 mailed Jun. 17, 1997.
Final Office Action for U.S. Appl. No. 10/371,759 mailed Dec. 9, 2008.
Office Acton for U.S. Appl. No. 10/871,759 mailed Jan. 25, 2008.
Final Office Action for U.S. Appl. No. 10/371,759 mailed May 3, 2007.
Office Action for U.S. Appl. No. 10/371,759 mailed Oct. 12, 2005.
Office Acton for U.S. Appl. No. 10/571,759 mailed Oct. 21. 2005.
Office Action for U.S. Appl. No. 10/371,759 mailed May 18, 2005.
Final Office Action for U.S. Appl. No. 09/128,552 mailed Nov. 19, 2001.
Office Action for U.S. Appl. No. 09/128,552 mailed May 25, 2001.
Final Office Action for U.S. Appl. No. 09/128,552 mailed Oct. 3, 2000.
Office Action for U.S. Appl. No. 09/128,652 mailed Dec. 14, 1999.
Offte Action for U.S. Appl. No. 10/079,221 mailed Aug. 8, 2003.
Office Action for U.S. Appl. No. 10/079,221 mailed Nov. 28, 2007.
Final Office Action U.S. Appl. No. 10/079,221 mailed Mar. 5, 2007.
Office Action for U.S. Appl. No. 10/079,221 mailed Sep. 11, 2006.
Office Action for U.S. Appl. No. 10/079,221 mailed Dec. 28, 2005.
Office Action for U.S. Appl. No. 10/079,221 mailed Jun. 24, 2005.
Office Acton for U.S. Appl. No. 10/079,221 maied May 10, 2004
Office Action for U.S. Appl. No. 10/607,196 mailed May 6. 2004.
Office Action U.S. Appl. No. 11/109,972 mailed Jun. 12, 2008.
Final Office Action for U.S. Appl. No. 11/109,972 mailed Sep. 10, 2007.
Office Action for U.S. Appl. No. 11/109,972 mailed Dec. 1, 2006.

Office Action for U.S. Appl. No. 11/109,972 mailed Mar. 10, 2006.
Office Action for U.S. Appl. No. 11/109,973 mailed Aug. 6, 2008.
Final Office Action for U.S. Appl. No. 11/109,973 mailed Nov. 21, 2007.
Office Action for U.S. Appl. No. 11/109,973 mailed Feb. 27, 2007.
Office Action for U.S. Appl. No. 11/109,973 mailed Jan. 31, 2006.
Office Action for U.S. Appl. No. 11/109,973 mailed Sep. 28, 2005.
Final Office Action for U.S. Appl. No. 11/113,360 mailed Oct. 4, 2007.
Office Action for U.S. Appl. No. 11/113,360 mailed Jan. 18, 2007.
Office Action for U.S. Appl. No. 11/113,360 mailed Jan. 31, 2006.
Office Action for U.S. Appl. No. 11/113,360 mailed Sep. 28, 2005.
Office Action for U.S. Appl. No. 11/113,313 mailed Aug. 5, 2008.
Final Office Action for U.S. Appl. No. 11/113,313 mailed Nov. 21, 2007.
Office Action for U.S. Appl. No. 11/113,313 mailed Feb. 27, 2007.
Office Action for U.S. Appl. No. 11/113,313 mailed Jan. 31, 2006.
Office Action for U.S. Appl. No. 11/113,313 mailed Oct. 7, 2005.
Final Office Action for U.S. Appl. No. 11/148,005 mailed Oct. 30, 2008.
Office Action for U.S. Appl. No. 11/148,005 mailed Jan. 10, 2008.
Office Action for U.S. Appl. No. 11/148,005 mailed Jan. 12, 2006
Office Action for U.S. Appl. No. 11/148,005 mailed Oct. 7, 2005.
Office Action for U.S. Appl. No. 11/287,208 mailed Oct. 20, 2008.
Final Office Action for U.S. Appl. No. 11/297,208 mailed May 15, 2008.
Office Action for U.S. Appl. No. 11/297,208 mailed Aug. 23, 2007.
Final Office Action for U.S. Appl. No. 11/297,208 mailed Jan. 29, 2007.
Office Action for U.S. Appl. No. 11/287,208 mailed Aug. 2, 2006.
Office Action for U.S. Appl. No. 11/297,206 mailed Aug. 18, 2008.
Final Office Action for U.S. Appl. No. 11/297,208 mailed Nov. 28, 2007.
Office Action for U.S. Appl. No. 11/297,208 mailed Apr. 5, 2007.
Final Office Action for U.S. Appl. No. 11/321,835 mailed Aug. 6, 2008.
Office Acton for U.S. Appl. No. 11/321,835 mailed Oct. 31, 2007.
Final Office Action for U.S. Appl. No. 11/321,835 mailed Mar. 23, 2007.
Office Action for U.S. Appl. No. 11/321,835 mailed Sep. 13, 2006.
Office Acton for U.S. Appl. No. 11/321,845 mailed Nov. 25, 2008.
Final Office Action for U.S. Appl. No. 11/321,845 mailed Jan. 9, 2008.
Office Action for U.S. Appl. No. 11/321,845 mailed Apr. 19, 2007.
Office Action for U.S. Appl. No. 11/321,843 mailed Jul. 28, 2008.
Final Office Action for U.S. Appl. No. 11/321,843 mailed Nov. 15, 2007.
Office Action for U.S. Appl. No. 11/321,843 mailed Feb. 28, 2007.
Office Action for U.S. Appl. No. 11/321,843 mailed Mar. 10, 2006.
Office Action for U.S. Appl. No. 11/321,844 mailed May 9, 2007.
Office Action for U.S. Appl. No. 11/321,788 mailed Oct. 20, 2008.
Office Action for U.S. Appl. No. 11/321,834 mailed Jun. 12, 2008.
Office Action for U.S. Appl. No. 11/321,834 mailed Aug. 23, 2007.
Office Action for U.S. Appl. No. 11/323,846 mailed Apr. 23, 2007.
Final Office Action for U.S. Appl. No. 11/323,846 mailed Nov. 6, 2006.
Office Action for U.S. Appl. No. 11/323,846 mailed Jun. 13, 2006.
Office Action for U.S. Appl. No. 11/323,846 mailed Oct. 4, 2007.
Office Action for U.S. Appl. No. 11/460,944 mailed May 26, 2010.
Final Office Action for U.S. Appl. No. 11/460,944 mailed Oct. 13, 2009.
Office Action for U.S. Appl. No. 11/460,944 mailed Dec. 30, 2008.
Final Office Action for U.S. Appl. No. 11/460,944 mailed Mar. 28, 2008.
Office Action for U.S. Appl. No. 11/460,944 mailed Jun. 28, 2007.
Office Action for U.S. Appl. No. 11/621,701 mailed Jun. 13, 2007.
Office Action for U.S. Appl. No. 11/623,895 mailed Oct. 6, 2008.
Final Office Action for U.S. Appl. No. 11/460,944 mailed Apr. 16, 2008.
Office Action for U.S. Appl. No. 11/460,944 mailed Jul. 6, 2007.
Office Action for U.S. Appl. No. 11/624,131 mailed Sep. 22, 2009.

Bisby II, R.H. et al., "Encapsulation: An approach to Operating System Security", USC/Information Sciences Institute, Marina del Rey, California, pp. 666-675, Oct. 1973.
Diffie, Whitfield et al., "New Direction in Cryptography", *IEEE Transactions on Information Theory*, The Institute of Electrical and Electronics Engineers, Inc., vol. 22, pp. 644-654, Nov. 1976 and better copy obtained from Internet with pages number sequence 29-40.
Harman, Harry H., Table of Contents from *Modern Factor Analysis*, Third Edition Revised, The University of Chicago Press, 6 pages, 1976.
Blom, Rolf et al., "Encryption Methods in Data Networks", Reprint from Ericsson Technics, No. 2, pp. 74-105, 1978.
Diffie, Whitfield et al., "Pricey and Authentication: An Introduction to Cryptography", *Proceedings of the IEEE*, vol. 67, No. 3, pp. 397-427, Mar. 1979.
Denning, Dorothy E., et al., "Data Security", *Computing Surveys*, vol. 11, No. 3, pp. 227-249, Sep. 1979.
Best, Robert M., "Preventing Software Piracy with Crypto-Microprocessors", *Proceedings of IEEE Spring COMPCOM 80*, pp. 466-469, Feb. 1980.
Kent, Stephen Thomas, "Protecting Externally Supplied Software in Small Computers", Thesis MIT/LCS/TR-255, Laboratory for Computer Science, Massachussetts Institute of Technology, pp. 1-254, Sep. 1980.
Anonymous, "DiscStore—The Electronic Distribution Solution for CD-ROM Publishing of Software Products, Images, Multimedia, Clipart Libraries, Books, Collections of Articles and Documentation", Electronic Publishing Resources (EPR), 2 pages, circa 1981.
Anonymous, "Top Secret 81* discussions of the CP8, First CII Honeywell Bull International Symposium on Computer Security and Confidentiality", Monaco Convention Center, pp. 1-21, Jan. 26-28, 1981.
Guillou, Louis C., "Smart Cards and Conditional Access", *Advances in Cryptology—Proceedings of Eurocrypt '84*, pp. 480-489, T. Beth et al. (Eds.), Spring-Verlag, 1985.
Anonymous, MICRO CARD™, MICRO CARD Technologies, Inc., 4 pages, 1985.
Anonymous, Complete issue of *The New Alexandria*, vol. 1, No. pp. 1-12, Jul. Aug. 1986.
White, Steve R. et al., "ABYSS: A Trusted Achitecture for Software Protection", *Proceedings 1987 Symposium on Security and Privacy, Oakland, Ca.*, The Institute of Electronics and Electrical Engineers, Inc., pp. 38-51, Apr. 27-29, 1987.
Wingart, Steve H., "Physical Security for the μABYSS System", *IEEE Symposium on Security and Privacy*, Oakland, CA, pp. 52-59, Apr. 27-29, 1987.
Herzberg, Amir et al., "Public Protection of Software", *ACM Transactions on Computer Systems*, vol. 5, No. 4, pp. 371-393, Nov. 1987.
Rankine, Gordon et al., "Thomas—A Complete Single Chip RSA Device", *Proceedings on Advances in Cryptology—CRYPTO '86*, Santa Barbara, CA, USA, pp. 480-487, 1987.
Anonymous, "ROI—Solving Critical Electronic Publishing Problems", Personal Library Software, 4 pages, 1987 or 1988.
Anonymous, "ROI—Announcing a Revolution in CD Publishing", Personal Library Software, 1 page, date unknown.
Anonymous, "The Benefits of ROI for Data Base Protection and Usage Based Billing", Personal Library Software, 5 pages, 1987-1988.
Anonymous, "The ROI Family of Electronic Publishing Tools", Electronic Publishing Resources Inc., 8 pages, date unknown.
Sinda, Karl, "Secutity Services in Teiecommunications Networks", Proceedings 1988 International Zurich Seminar On Digital Communications-Mapping New Applicaties onto New Technologies, IEEE Catalog No. 88TH0202-2, pp. A5.1-A5.7, Mar. 8-10, 1988.
Shear, Victor, "Solutions for CD-ROM Pricing and Data Security Problems" Section VI: The CD-ROM Business, pp. 530-523, 1988-1989.
Struif, Bruno, "The Use of Chipcards for Eiectronic Signatures and Encryption", *Proceedings 1989 Conference VLSI & Computer Peripherals*, IEEE Computer Society Press; 1989.

Mori, Ryoichi et al. "Superdistribution: The Concept and the Architecture", Transactions of the Institute of Electronic Information, and Communication Engineers, vol. E73, No. 7, pp. 1133-1146, Jul. 1990.

DSP56000/DSP56001 Digital Signal Prcoessor User's Manual, Motorola, p, 2-2, 1999.

Tygar, J. D. et al, "Dyed: A System for Using Physical Secure Coprocessors", CMU-CS-91-140R, School of Computer Science Carnegie Mellon University, 38 pages, May 4, 1991.

Tygar, J.D. et al., "Dyad; A System for Using Physically Secure Coprocessors", Technological Strategies for the Protection of Intellectual Property in the Networked Multimdia Environment, Harvard University Press and the Interactive Multimedia Association, 1994, pp, 121-425, 26 pages printed from http://www.eni.org/docs/ima.ip-workshop/Tygar.Yee.html.

Rose Lance, "Cyberspace and the Legal Matrix: Laws or Confusion?", first published in *Broadwatch*, Jun. 1, 1991, [Internet] http://www.eff/org/legal.?f=cyberspace_legal_matrix.article.txt, 5 pages, printed Feb. 25, 2005.

Dussé, Stephen R. et al, "A Cryptographic Library for the Motorola DSP56000", *Proceedings EUROCRYPT* 90, pp. 230-241, Springer-Verlag, 1991. Reprinted in 1998.

Rosenthal, Steve, "The Gold Rush is on", *New Media*, pp. 27-29, Dec. 1992.

Rosenthal, Steve, "Viewers Get Involved", *New Media*, pp. 30-31, Dec. 1992.

Pekin. Joseph N. "Why Nicholas Negroponte is Wrong About the Future of Telecommunication", The Future of Telecommunication Special Section in *Telecommunications*, pp. 35-40, Jan. 1993.

Negroponte, Nicholas, Some Thoughts on Likely and Expected Communications Scenarios: A Rebuttal, *Telecommunications*, pp. 41-42, Jan. 1993.

Smith, Sean W. et al, "Signed Vector Timestamps: A Secure Protocol for Partial Order Time", CMU-CS-93-116, School of Computer Science, Carnegie Melon University, Pittsburgh, PA 15213, pp. 1-15, Oct. 1991, version of Feb. 1993.

Tygar, J.D. et al., "Cryptogoaphy: It's Not Just for Electronic Mail Anymore", CMU-CS-93-107, School of Computer Science, Carnegie Mellon University, Pittsburgh, PA 15213, 21 pages, Mar. 1, 1993.

Anonymous, "Cable Television and America's Telecommunications Infrastructure", National Cable Television Association, 20 pages, Apr. 1993.

Stephenson, Tom, "The Info Infrastructure Initiative: Data SuperHighways and You", Advanced Images, pp. 74-75, May 1993.

Valovic, Thomas, "The Role of Computer Networking in the Emerging Virtual Marketplace", *Telecommunications*, pp. 40 et seq., May 1993.

Schlosstein, Steven, "Coming Soon to a Market Near You—America's New Software Revolution is Transforming the Economy, Will Revitalize U.S. Manufacturing, and May Redefine the U.S.—Japan Relationship,Too.", International Economy, America; The G7's Comeback Kid, 5 pages, Jun./Jul. 1993.

Kelly, Kevin, "E-Money," *Whole Earth Review*, pp. 40-59, Summer 1993.

Rosenthal, Steve. "Mega" New Media, p. 36, Sep. 1993.

Baum, Michael, Conference Chair, "Worldwide Electronic Commerce Program", 18 pages, emailed Nov. 11, 1993.

Weitzner, Daniel J., "A Statement on EFFs Open Platform Campaign as of Nov. 1993", 3 pages, Nov. 1993.

Mitchell, Kapor, et al., "A Superhighway Through the Wasteland?", EFFector Online, vol. 6, No, 6, 8 pages, Dec. 6, 1993.

Anonymous, Serving the Commonity: A Public-Interest Vision of the National Information Infrastructure, Computer Professionals for Social Responsibility, 30 pages, circa 1993.

Office of the Vice President, The White House, "Background on the Administration's Telecommunications Policy Reform Initiative", News Release, 48 pages, Jan. 11, 1994.

Lanza, Mike, George Gilder's Fifth Article—Digital Darkhorse—Newspapers, 2 page email, Feb. 21, 1994.

Schrage, Michael et al., Is Advertising Dead?, *Wired*, vol. 2.02, 10 pages, Feb. 1994, printed Feb. 8, 2005.

Computer Systems Policy Project (CSPP), Perspectives on the National Information Infrastructure: Ensuring Interoperability (Feb. 1994), Feb. 1994.

Press Release "National Semiconductor® and EPR™ Partner for Information Metering/Data Security Cards", EPR Electronic Commerce Technologies, 4 pages, Mar. 4, 1994.

Kristol David M. et al., "Anonymous Internet Mercantile Protocol", AT&T Bell Labonitories, pp. 1-16, draft Mar. 17, 1994.

Sterling, Bruce, "Literary Freeware: Not for Commercial Use", Remarks at Computers, Freedom and Privacy Conference IV, Chicago, III, 5 pages, Mar. 26 1994.

"Multimedia Mixed Object Envelopes Supporting a Graduated Fee Scheme via Encryption", IBM Technical Disclosure Bulletin, vol. 37, No. 3, pp. 413-418, Mar. 1994.

Anonymous, "Transformer Rules Strategy for Software Distribution Mechanism-Suppon Products", *IBM Technical Disclosure Bulletin*, vol. 37, No. 04B, pp, 523-525, Apr. 1994.

Garcia, Linda, Testimony of D. Linda Garcia, Project Director Telecommunication and Computing Technologies Program, Office of Technotou Assessment, United States Congress, Before a Hearing on Science, Space, and Technology, Subecommittee on Technology, Environment, and Aviation, pp, 97-108, May 26, 1994.

Yoe, Bennet, "Using Secure Coprocessors", Doctorial Thesis, CMU-CS-94-149, School of Computer Science, Carnegie Mellon University, Pittsburgh, PA, 15213, pp, 1-94 May 1994.

Barnes, Hugh, Email to Henry LaMuth, Subject: George Glider articles, 2, pages, May 31, 1994.

Choudhury, A. K. et al., "Copyright Protection for Electronic Publishing over Computer Networks", submitted to IEEE Network Magazine, pp. 1-18, Jun. 1994.

Reilly, Arthur K., Statement at Panel One of the International Telecommunications Hearings, Component Technologies of the NII/GII, 14 pages, Jul. 27, 1994.

Low, S. H. et al., "Document Marking and Identification using both Line and Word Shifting", AT&T Bell Laboratories, article submitted for publication, copy as of Jul. 29, 1994; [Internet] ftp://fpt.research.att.com/dist/brassil/docmark2.ps, pp. 1-22, Jul. 29, 1994.

Lehman, Bruce A, Assistant Secretary of Commerce and Commissioner of Patents and Trademarks, Intellectual Property and the National Information Infrastructure, Green Paper, Preliminary Draft of the Working Group On Intellectual Property Rights, pp. 1-141, Jul. 1994.

Anonymous, "Framework for National Information Infrastructure Services", U.S. Department of Commerce, Technology Administration, National Institute of Standards and Technology, Computer Systems Laboratory, 12 Slides, Jul. 1994.

Majurski, William et al., "Framework for National Information Infrastructure Services", U.S. Department of Commerce, Technology Administration, National Institute of Standards and Technology, Computer Systems Laboratory, pI—Appendix E4, Draft Jul. 1994.

Press, Larry, Tomorrow's Campus—Information Processing at Tomorrow's University, *Communications of the ACM*, vol. 37, No. 7, pp. 13-17, Jul. 1994.

Riecken, Doug, Guest Editor, "Intelligent Agents", Introduction to issue on Intelligent Agents, *Communications of the ACM*, vol. 37, No. 7, pp. 20-21, Jul. 1994.

Riecken, Doug, "A Conversation with Marvin Minsky About Agents", *Communications of the ACM*, vol. 37, No. 7, pp. 23-29, Jul. 1994.

Maes, Pattie, "Agents that Reduce Work and Information Overload", *Communications of the ACM*, vol. 37, No. 7, pp. 31-40, 146, Jul. 1994.

Edmonds, Ernest A., "Support for Collaborative Design: Agents and Emergence", *Communications of the ACM*, vol. 37, No. 7, pp. 41-47, Jul. 1994.

Genesereth, Michael R. et al., "Software Agents", *Communications of the ACM*, vol. 37, No. 7, pp. 48-52, 147, Jul. 1994.

Smith, David Canfield, "KIDSIM: Programming Agents Without a Programming Language", *Communications of the ACM*, vol. 37, No. 7, pp. 55-67, Jul. 1994.

Norman, Donald, A., "How Might People Interact with Agents", *Communications of the ACM*, vol. 37, No. 7, pp. 68-71, Jul. 1994.

Etzioni, Oren et al., "A Softbot-Based Interface to the Internet", *Communications of the ACM*, vol. 37, No. 7, pp. 72-76, Jul. 1994.
Mitchell, Tom et al., "Experience with a Learning Personal Assistant", *Communications of the ACM*, vol. 37, No. 7, pp. 81-91, Jul. 1994.
Selker, Ted, "Coach: A Teaching Agent that Learns", *Communications of the ACM*, vol. 37, No. 7, pp. 92-99, Jul. 1994.
Greif, I., "Desktop Agents in Group-Enabled Products", *Communications of the ACM*, vol. 37, No. 7, pp. 100-105, Jul. 1994.
Riecken, Doug, "M: An Architecture of Integrated Agents", *Communications of the ACM*, vol. 37, No. 7, pp. 107-116, 146, Jul. 1994.
Boden, Margaret A., "Agents and Creativity",. *Communications of the ACM*, vol. 37, No.7, pp. 117-121, Jul. 1994.
Bates, Joseph., "The Role of Emotion in Believable Agents",*Communications of the ACM*, vol. 37, No. 7, pp. 322-125, Jul. 1994.
Guha, R. V. et al., "Enabling Agents to Work Together", *Communications of the ACM*, vol. 37, No. 7, pp. 127-142, Jul. 1994.
Kautz, Henry A. et al., Bottom-Up Design of Software Agents, *Communications of the ACM*, vol. 37, No. 7, pp. 143-145, Jul. 1994.
O'Reilly, Tim, "Publishing Models for Internet Commerce", *Communications of the ACM*, vol. 37, No. 7, pp. 79-86, Jul. 1994.
Anonymous, "Fuzzy Logic Has Finally Gotten Down to Business", Product advertisement for FuzzySP, NeuralWare, 2 pages, circa Jul. 1994.
Anonymous, Open System Environment—Architectural Framework for National Information Infrastructure Service and Standards, For IITF Technology Policy Working group and Distributed System Engineering Program Sponsor Group, Draft 1.0, pp. 1-34, Aug. 5, 1994.
Bart, Dan, Comments in the Public Hearing and Request for Comments on the International Aspects of the National Information Infrastructure, Telecommunications Industry Association, 15 pages, Aug. 12, 1994.
Maxemchuk, N. F., "Electronic Document Distribution", *AT&T Technical Journal*, pp. 73-80, Sep. 1994.
Low, Steven H. et al., "Anonymous Credit Cards and its Collusion Analysis", *IEEE/ACM Transactions on Networking*, vol. 4, No. 6, pp. 809-811, Oct. 10, 1994.
McKenna, Jeff et al, Conference Chair, Table of Contents, OOPSLA '94, Conference on Object-Oriented Programming Systems, Languages, and Applications, Portland, OR, 4 pages, Oct. 23-27, 1994.
Weber, Robert Dr., "Metering Technologies for Digital Intellectual Property: A Report to the International Federation of Reproduction Rights Organisations", Commissioned by the Committee on New Technologies, International Federation of Reproductions Rights Organisations, 36 pages, Oct. 1994.
Low, Steven H. et al., "Anonymous Credit Cards", *Proceedings of the Second ACM Conference on Computer and Communication Security*, Fairfax, VA, USA, pp. 1-10, Nov. 2-4, 1994.
Levy, Steven, "E-MONEY (That's What I Want)", *Wired*, vol. 2.12, pp. 174, 176-179, 213-217, Dec. 1994.
Anonymous "SMARTPAPER—Documents That Both People and Computers Understand", Xerox Corporation, 4 pages, 1994.
Anonymous, SmartPaper: Technical Overview, Xerox Corporation, 2 pages, circa 1994.
Burns, N., Workflow automation: a methodology for change, The Workflow CD-ROM Sampler™. Creative Networks, 1994.
Anonymous, "EIA and TIA White Paper on National Information Infrastructure", Electronic Industries Association, pp. 1-22, circa 1994.
"About the Digital Notary Service", Surety Technologies, 2 pages, 1994-1995.
"Answers to Frequently Asked Questions about the Digital Notary™ Service", Surety Technologies, 4 pages, 1994-1995.
Ameke, David et al., "AT&T Encryption System Protects Information Services", Press Release, 1 page, Jan. 9, 1995.
Cunningham, Donna, News Release for AT&T, "AT&T, VLSI Technology join to Improve info highway security", 3 pages, Jan. 31, 1995.
HotJava# "The Security Story", Sun Microsystems, Inc., 4 pages, May 1995.
Dyson, Esther, "Intellectual Value", *Wired*, vol. 3.7, pp. 136-141, 183-184, Jul. 1995.
Caruso, Denise, Digital Commerce: 2 plans for watermarks, which can bind proof of authorship to electronic works, New York Times, Technology Section, p. D5, Aug. 7, 1995.
"Applications Requirements for Innovative Video Programming", IMA/LDA DVD Conference Proceedings, Universal City, CA, pp. 1-74, Oct. 19-20, 1995.
Weber, Robert Dr., "Digital Rights Management Technologies", A Report to the International Federation of Reproduction rights Organisations, pp. 1-49, Oct. 1995.
Anonymous, "The Xerox DataGlyph™ Software Developer's Kit (SDK)", 2 pages, Nov. 2, 1995.
Anonymous; "Xerox Announces Software Kit for Creating "Working Documents™", with Dataglyphs™", 2 pages, Nov. 6, 1995, last updated Apr. 9, 1996.
Greguras, Fred, "Copyright Clearances and Moral Rights", SOFTIC Symposium '95, 3 pages, Nov. 30, 1995.
Anonymous; "WEPIN Store—Steganography (Hidden Writing)", West El Paso Information Network, 1 page, 1995.
Stefik, Mark, "Classification", Chapter 7 of Introduction to Knowledge Systems, pp. 543-607, Morgan Kaufmann Publishers Inc., 1995.
Cooperman, Marc, "Argent Digital Watermark System, Version 1.2", The DICE Company, 8 pages, copyright 1995, updated 1996.
Premenos Corp., "White Paper: The Future of Electronic Commerce", Premenos Corp., 4 pages, circa 1995-1996.
Press Release, "Premenos Announces Templar 2.0—Next Generation Software For Secure Internet EDI", RSA Data Security Conference, San Francisco, CA, 1 page, Jan. 17, 1996.
Anonymous, "Templar Software and Services—Secure, Reliable, Standards-Based EDI Over the Internet", Premenos, 3 pages, circa 1996.
Köhntopp, Marit Kiel, "Sag's durch die Blume—Steganographie als Vereschlüsselungstechnik", 4 pages, Apr. 1996.
Anonymous, "Portland is not your average city", Portland Software, 3 pages, has link to "Ziplock: The Instant Commerce Solution", atOnce Software, 8 pages, last updated May 22, 1996.
"Frequendy Asked Questions—Applet Security", JavaSoft, Sun Microsystems, Inc., 8 pages, Jun. 7, 1996.
Verity, John W., "Invoice? What's An Invoice?", pp. 110-112, Jun. 10, 1996.
Gleick, James, "Dead as a Dollar", *The New York Times Magazine*, Section 4, pp. 6-8, 27, 35, 42, 50, 54, Jun. 16, 1996.
Fox. Robert, "News Track", *Communications of the ACM*, vol. 39, No. 6, pp. 9-10, Jun. 1996.
Soloway, Elliot, "Teachers are the Key", *Communications of the ACM*, vol. 39, No. 6, pp. 11-14, Jun. 1996.
Berghel, Hal, "U.S. Technology Policy In the Information Age", *Communications of the ACM*, vol. 39, No. 6, pp. 15-21, Jun. 1996.
Pyle, Raymond: Guest Editor, "Electronic Commerce and the Internet", *Communications of the ACM*, vol. 39, No. 6, pp. 22-23, Jun. 1996.
Sivori, John R., "Evaluated Receipts and Settlement at Bell Atlantic", *Communications of the ACM*, vol. 39, No. 6, pp. 24-28, Jun. 1996.
Bhimani, Anish, "Securing The Commercial Internet", *Communications of the ACM*, vol. 39, No. 6, pp. 29-35, Jun. 1996.
Borenstein, Nathaniel S. et al., "Perils and Pitfalls of Practical Cybercommerce", *Communications of the ACM*, vol. 39, No. 6, pp. 36-44, Jun. 1996.
Panurach, Patiwat, "Money in Electronic Commerce: Digital Cash, Electronic Fund Transfer, and Ecash", *Communications of the ACM*, vol. 39, No. 6, pp. 45-50, Jun. 1996.
Hämäläinen, Matti et al, "Electronic Markets for Learning: Education Brokerages on the Internet", *Communications of the ACM*, vol. 39, No. 6, pp. 51-58, Jun. 1996.
Chon, Kilnam, Guest Editor, "Internet Inroads", *Communications of the ACM*, vol. 39, No. 6, pp. 59-60, Jun. 1996.
Hinden, Robert M., "IP Next Generation Overview", *Communication of the ACM*, vol. 39, No, 6, pp., 62-71, Jun. 1996.
Ang, Peng et al, "Censorship and the Internet: A Singapore Perspective", *Communications of the ACM*, vol. 39, No. 6, pp. 72-78, Jun. 1996.
O'Reilly, Tim, "Publishing Models for Internet Commere", *Communications of the ACM*, vol. 39, No. 6, pp. 79-86, Jun. 1996.

Kirstein, Peter et al., "The C-ODA Project: Online Access to Electronic Journals", *Communications of the ACM*, vol. 39, No. 6, pp. 87-99, Jun. 1996.

Mannoni, Bruno, "Bringing Museums Online", *Communications of the ACM*, vol. 39, No. 6, pp. 100-105, Jun. 1996.

Pitkow, James E et al., "Emerging Trends in the WWW User Population", *Communications of the ACM*, vol. 39, No. 6, pp. 106-108, Jun. 1996.

Lunt, Teresa, "Create the µPs and PCs of the 21$^{st}$ Century", *Communications of the ACM*, vol. 39, No. 6, pp. 126-130, Jun. 1996.

Dempsey, Lorcan et al., "The Warwick Metadata Workshop: A Framework for the Deployment of Resource Description", *D-Lib Magazine*, [Internet] http://www.dlib.org/dlib/july96//07weibel.html, 13 pages, Jul./Aug. 1996.

Lagoze, Carl, "The Warwick Framework—A Container Architecture for Diverse Sets of Metadata", D-Lib Magazine, [Internet] http://www.dlib.org/dlib/july96/lagoze/07lagoze.html, 11 pages, Jul./Aug. 1996.

Sagar, Ira, Editor, "Spying on the World Through a Cyber-Lens", in "Bits & Bytes", *Business Week*, p. 142E, Sep. 23, 1996.

Stefik, Mark J., "Letting Lose the Light: Igniting Commerce in Electronic Publication", in *Internet Dreams: Archetypes, Myths and Metaphores*, pp. Table of Contents and pp. 221-253, The MIT Press, Sep. 1996.

Mossberg, Walter S. "Threats to Privacy On-Line Become More Worrisome", in Personal Technology, *Wall Street Jr.*, p. B1, et seq., Oct. 12, 1996.

Nagropnte, Nicholas, "Electronic Word of Mouth", *Wired*, vol. 4.10, unknown page, Oct. 1996.

Voight, Joan, "Beyond the Banner", *Wired*, vol. 4.12, pp. 196, 200, 201, Dec. 1996.

Yellin, Frank, "Low Level Security in Java", [Internet], http://java.sun.com/sfaq/verifier.html., 14 pages, 1996, printed Feb. 8, 2005.

Schürman, Jürgen, *Patterson Classification—A Unified View of Statistical and Neural Approaches*, Table of Contents, John Wiley & Sons, Inc, 1996.

Jiang, Jay J. et al, "A Concept-Based Approach to Retrieval from an Electronic Industrial Directory", *International Journal of Electronic Commerce*, vol. 1, No. 1, pp. 51-72, Fall 1996.

Rothstein, Edward. "'Push' Technology Makes the Internet Come to You." *New York Times*, Jan. 20, 1997 (posted at http://www.nytimes.com/library/cyber/techcol/012097techcol.html).

Resnick, Paul et al., "Recommender Systems", *Communications of the ACM*, vol. 40, No. 3, pp. 56-58, Mar. 1997.

Terveen, Loren et al., "PHOAKS: A System for Sharing Recommendations", *Communications of the ACM*, vol. 40, No. 3, pp. 59-62, Mar. 1997.

Kautz, Henry et al., "Referral Web: Combining Social Networks and Collaborative Filtering", *Communications of the ACM*, vol. 40, No. 3, pp. 63-65, Mar. 1997.

Balabanovic, Marko et al., "Fab: Content-Based, Collaborative Recommendation", *Communications of the ACM*, vol. 40, No. 3, p. 66-72, Mar. 1997.

Rucker, James et al., "Siteseer: Personalized Navigation for the Web", *Communications of the ACM*, vol. 40, No. 3, p. 73-75, Mar. 1997.

Konstan, Joseph A., "GroupLens: Applying Collaborative Filtering to Usenet News", *Communications of the ACM*, vol. 40, No. 3, pp. 77-88, Mar. 1997.

Avery, Christopher et al., "Recommender Systems for Evaluating Computer Messages", *Communications of the ACM*, vol. 40, No. 3, pp. 88-89, Mar. 1997.

Editors, "The Internet: Fulfilling the Promise", *Scientific American*, pp. 49-51, Mar. 1997.

Lynch, Clifford, "Searching the Internet", *Scientific American*, pp. 52-56, Mar. 1997.

Resnick, Paul, "Filtering Information on the Internet", *Scientific American*, pp. 62-64, Mar. 1997.

Hearst, Marti A., "Interfaces for Searching the Web", *Scientific American*, pp. 68-72, Mar. 1997

Stefik, Mark, "Trusted Systems", *Scientific American*, pp. 78-80, Mar. 1997.

Kahle, Brewster, "Preserving the Internet", *Scientific American*, pp. 80-81, Mar. 1997.

PowerAgent Press Release, "Proper Use of Consumer Information on the Internet White Paper", [Internet] http://www.poweragent.com/cgi-bin/whitepaper.pl?r=$r&i=$i&ad=$ad, 8 pgs, Jun. 1997.

MacLachlan, Malcolm, "PowerAgent Debuts Spam-Free Marketing", Techwire, [Internet] http://www.techweb.com/wire/news/aug/0804spam.html, 3 pages, Aug. 4, 1997.

Vander Haar, Steven, "Power Agent Launches Commercial Service", [Internet] http://www4.zdnet.com/intweek/daily/970804g.html, 1 page, Aug. 4, 1997.

Bruner, Rick E., "PowerAgent, NetBot help advertisers reach Internet shoppers", Advertising Age, [Internet] http://www.adage.com/interactive/articles/19970804/article4.html, 2 pages, Aug. 1997.

PowerAgent Press Release, "What The Experts Are Reporting On PowerAgent", [Internet] http://www.marketer.poweragent.com . . . t/press_releases/pr_081197_eds.html, 3 pages, Aug. 1997.

Rutkowski, Ken, "PowerAgent Indtroduces First Internet 'Infomediary' to Empower and Protect Comsumers", Tech Talk News, [Internet] http://www.ttalk.com/news/stories/power8497.html, 4 pages, Aug. 4, 1997.

"PowerAgent Introduces First Internet 'Infomediary' to Empower and Protect Comsumers", Press Release published on *Techmall*, [Internet] http://techmall.com/techdocs/TS970804-6html, 3 pages, Aug. 4, 1997.

Clark, Tim, "Ad service gives cash back", c/net section The Net, [Internet] http://www.news.com/News/Item/0,4,13050.00.html, 2 pages, Aug. 4, 1997.

Holt, Stannie, "Start-up promises user confidentiality in Web marketing service", *Info World Electric*, 2 pages, Aug. 4, 1997.

Bagget, Claude, "Cable's Emerging Role in the Information Superhighway", CableLabs, 13 pages, circa 1998-1999.

"Codecard—Basic Coder Subsystem" and "PC-Safe Specification Sheet", 4 pages, unknown date.

Anonymous, "New Products, Systems and Services", AT&T Technology, AT&T, Inc., vol. 9, No. 4, pp. 16-19, unknown date.

IISP Breakout Session Report for Group Number 3, Standards Developments and Tracking System, 14 pages, unknown date.

Barassi, Theodore S. Esq., "Public Key Registration and Cerification and Authentication of International Legal Transactions", American Bar Association Section of Science and Technology Law, United States Council For International Business, 7 pages, unknown date.

"Break Out Session: User/Content Provider Standards Needs", Information Infrastructure Standards Panel: NII "The Information Superhighway", Nationsbank—HGDeal—ASC X9, 19 pages, unkown date.

Hofmann, Jud, "Interfacing the NII to User Homes," Electronic Industries Association, Consumer Electronic Bus Committee, 14 slides, unknown date.

Weber, Adele, "Life on the Infohighway", *Insite*, unknown pages & date.

Anonymous, "An Architectural Framework for the National Information Infrastructure", Cross-Industry Working Team (XIWT), 22 pages, last updated Jul. 12, 1999.

Anonymous, "Electronic Currency Requirements", Cross Industry Working Group (XIWT), 18 pages, unknown date.

Anonymous, "Common Gateway Interface", CGI: Common Gateway Interface, http://boohoo.nesa.uiuc.edu/intro.html, 2 pages, unknown date.

Anonymous, "www FAQ: How can I put an access counter on my home page?", [Internet] http://www.unimelb.edu.au/public/www-faq/counters.htm, 1 page, unknown date, printed Apr. 26, 2005.

Feiertag, Richard J. et al., The Foundations of a Provably Secure Operating System (PSOS), Proceedings of the National Computer Conference, AFIPS Press, pp. 329-334, 1979.

Neumann, Peter G. et al., "A Provably Secure Operating System: The System, Its Applications, and Proofs", Computer Science Laboratory Report CSL-116, Science Edition, pp. Cover Page through C-V-1.2, May 7, 1980.

Schaumueller-Biehl, Ingrid et al., "A Method of Software Protection Based on the Use of Smart Cards and Cryptographic Techniques." Eurocrypt 1984, pp. 446-454, 1984.

* cited by examiner

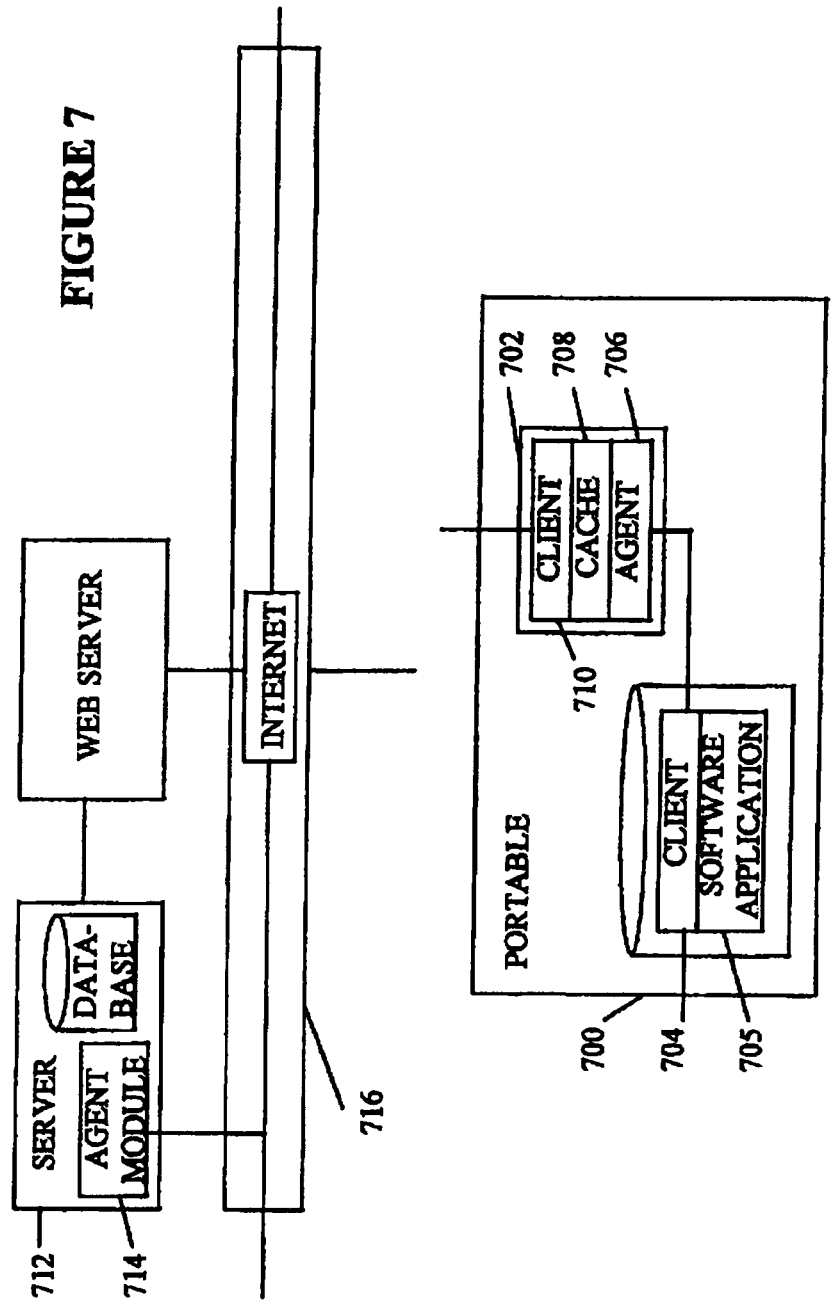

METHOD FOR SYNCHRONOUS ENCRYPTION BETWEEN A CLIENT AND A LICENSING AGENT

CROSS REFERENCE TO RELATED APPLICATIONS

This application is a divisional of U.S. patent application Ser. No. 11/119,373, filed Apr. 29, 2005, which is a continuation of U.S. patent application Ser. No. 10/079,221, filed Feb. 19, 2002, incorporated herein by reference in its entirety, which is a continuation of U.S. patent application Ser. No. 09/128,652, filed Aug. 4, 1998, which is a continuation of U.S. patent application Ser. No. 08/607,081, filed Feb. 26, 1996, now issued as U.S. Pat. No. 5,790,664.

BACKGROUND

The present invention relates to software licensing, and in particular to a system for automated monitoring and management of licensed software.

It is well known that software is not purchased, but only licensed for use. Software, unlike manufactured products, can be freely copied and distributed. Hence, software providers are largely limited in their choice of control means. Unfortunately, a software license is merely a legal mechanism, and cannot literally prevent illicit copying of proprietary software. A typical software license grants a permit to use the licensed software application on a particular machine and, perhaps, the generation of backup copies for personal use. A software license provides a software provider with a legal instrument against impermissible use of licensed software. However there remains no effective mechanism for preventing or monitoring illicit copying or illegal proliferation in the first place. Hence, software providers must rely on the public to not pirate software, and rely on their licensees to abstain from furnishing copies of software to friends or others. A significant amount of software piracy occurs in commercial settings. Commercial licensees are usually vigilant about license compliance. However, even the most attentive MIS manager (Management Information Systems) cannot prevent employees from copying software off of company machines for their personal use. As a result of illicit copying, software providers must adjust their prices, forcing legitimate buyers to pay higher prices to offset revenue losses.

Although the estimates for losses due to piracy are estimated in the billions of U.S. dollars, such estimates remain mere projections. This is because their way of determining how widely software is copied. More specifically, there is no mechanism by which to monitor the proliferation and use of software, copied or otherwise. Statistics regarding the use of legitimately purchased software also remains unknown to software providers and vendors. Despite sales data, purchased software may be found ineffective by users and sit, unused, on hard drives. Consequently, software providers may not have a firm understanding of how their products are being received by users. Whether used or not, most proprietary software contains some security mechanism and/or registration mechanism.

There are a number of schemes designed to prevent software from being copied, or to make use of copied software unduly burdensome. These schemes, however, are largely ineffective, complex, and add to development costs. Furthermore, for every protection scheme devised by programmers, there are hackers who will diligently go about undermining them. A first line of defense is to encourage legitimate users to register their licensed software.

Registration of software provides a software provider with a record of a valid license. Registration typically involves filling out and mailing a registration card that is provided in an off-the-shelf software package. A user may be asked to write in the serial number of the software set, along with other pertinent information. The defense mechanism in registration, albeit weak, is that a software provider will only render assistance and support to properly registered users. That is, a software provider will refuse to grant assistance to a user unless the user has properly registered their software.

The registration process also may involve responding to prompts generated by the software when it is first run. The prompt may be a security system asking the user to enter the serial number and/or a codeword to enable the software. The codeword may be a word appearing at prompt-designated locations in a user manual. This security scheme operates on the premise that a pirate will not ordinarily have a copy of the user manual. After the software is up and running, it may periodically prompt the user to re-enable the software by entering a different codeword appearing at varying locations in the user manual. This scheme is subverted by copying the manual and registration number.

An on screen registration/enablement process may involve writing the registration number to disk. This is only possible with floppy disks as CD-ROMS are, at present, a largely read-only medium. If the disk is used again to load the software application, the software may prompt the user with a warning that the software has already been loaded (e.g., "IS LOADING OF THIS SOFTWARE PERMITTED? RECORDS INDICATE THAT THIS SOFTWARE HAS ALREADY BEEN LOADED. YOU MAY BE IN VIOLATION OF YOUR LICENSE AGREEMENT."). However, reloading of software may be normal in the event of hard disk failure. Consequently, software providers cannot feasibly prevent the software application from being loaded more than once. Furthermore, if first run registration enablement is required, copiers can simply copy the software repeatedly prior to registering the original copy.

Another security technique is to enable a software application for a defined period of time. This usually involves incorporating a date/time checking mechanism into the software application. Such a mechanism may be used where a software provider wants to supply, for example, a 30-day demonstration version of a software application for user evaluation. If the user decides to purchase a license following the evaluation period, the user may contact the software provider and supply payment information. Following approval (e.g., credit card) or receipt (i.e., check) of the payment, the software provider may supply the user with a regular copy of the software, or provide instructions or a codeword to disarm or reset the date/time checking mechanism.

In operation, a date/time checking mechanism records a date/time stamp when a software application is first brought up. Alternatively, or in addition, the date/time mechanism may start a timer when the application is brought up. The date/time stamp is compared with the system date/time information maintained by the computer to determine if the software application is to be disabled. To subvert such a system, users have been known to reset the system date and system time to prevent expiration. In response, some software providers have resorted to writing complex code schemes to disable the software in the event that the system date is tampered with. Such a security mechanism is often used to control licensed software used in a commercial setting.

Software sold for use in a commercial or institutional setting is frequently licensed for a predefined period of time. When such software is used on desktop computers, such computers are typically networked. The networked computers are usually connected to a file server, which file server may itself be tended by a computer management system that monitors and controls various file server groups. The file server computers act as a central location at which the desktop computers in the file server group can access files and applications. The file server also may facilitate the control of licensed software on the desktop computers. This occurs in the situation where the commercial software license is a so-called "floating license."

Commercial software licenses for operating a plurality of desktop computers normally are of two varieties: "fixed" or "floating." A fixed license permits a software application to run on certain designated computers (e.g., computer numbers one through five, in a ten computer file server group, are designated for the licensed software application). A floating license permits a certain number of applications to run on any number of computers at a given time. So an application operating under a floating license may be allowed to simultaneously run on no more than ten of twenty computers in a network at any given time. Licensing management software is maintained in the network file server to monitor the number of floating licenses being used.

Commercial software is prone to installation interruptions, as it almost always requires involved enablement procedures. In accordance with regular industry practices, commercial software applications are ordinarily enabled following their installation by contacting the software provider for enablement instructions and/or enabling codes. This process is rarely instantaneous. The software provider usually confirms that the software license is proper and paid for before faxing, e-mailing, or even using regular mail, to provide a set of enabling instructions, enabling codes, or disk(s) with which to bring the application up. Consequently, the software remains disabled until additional instructions are supplied and followed, which are usually sent only after an enablement request is approved.

Management of floating licenses on networked computers involves two control software components: an application portion, and an authenticator portion. The application portion is nested within an application running on a desktop computer. The authentication portion is a code module contained in the file server that monitors and authorizes applications running on the desktop computers. When a user attempts to open the application software, the application portion code communicates with the authenticator code module to check to see if a floating license is available. If the maximum number of floating licenses are already being used, the software application is not allowed to open. Licensing control software also may be used to monitor defined term licenses to disable software in networked machines after license expiration.

If a commercial license expires, the software may be disabled, midstream, preventing users from completing projects. Re-enablement requires contacting the software provider to purchase an additional license or extension. This may require re-execution of enablement procedures with new instructions or codes. Hence, it may take some time before the software application is up and running again, which situation can seriously inconvenience users.

The common shortcoming shared by all licensed software, is that it requires some form of manual intervention for registration, enablement, and/or re-enablement. Manual intervention is cumbersome and can render software useless until it is enabled or re-enabled. The paramount issue is, however, that software providers have no mechanism for monitoring and controlling the actual use, whether legitimate or illicit, of their product. Proprietary software is misappropriated on a global scale causing massive losses to software providers, which losses are inevitably passed on to legitimate licensees.

What is needed is a licensing system that allows software use to be monitored in an automated fashion, without user input. Moreover, a software licensing system is needed that permits a software provider to transparently control the use of licensed software.

SUMMARY

The present invention addresses the foregoing problems by providing a system for automatically determining whether a software application is licensed. In accordance with the invention, a generic licensing module, or "client module," is provided that a software provider can attach to a software application. A software application having a client module attached thereto is hereinafter referred to as a "client application." In accordance with preferred embodiments of the invention, a client application loaded on a computer having access to a public network, such as the Internet, automatically reports to a computer maintained by a software provider. The client module is a program, application, or like composition of code that is preferably nested in a compiled version of a software application (i.e., to form a client application).

However, the client module can, in alternative embodiments of the invention, be attached to a previously compiled software application. Whether it is referring to a program nested in, or attached to a software application, the term client module is used throughout the present disclosure.

A client module utilizes the public network as a means to transparently send license inquiry request messages to, and receive license inquiry response messages from, a license server maintained by a software provider. The license server has a database on which license information, or records, are stored. The license server also can record information contained in license inquiry request messages, and thereby audit use of client applications. The license record can identify a license in accordance with a hardware address, or hardware identifier of the computer, such as an IP address.

Operation of an exemplary system incorporating the invention involves the client module in a client application generating inquiries that are sent to the license server in the context of an Internet communication session. The license server responds to the inquiry by investigating its database to determine whether a corresponding license record is present. The license server then forms an appropriate response message that is sent back to the client module.

If it is determined that the client application is not licensed (i.e., the database does not contain a corresponding license record), the response sent by the licensing server does not allow the client application to be enabled. If the client application is licensed (i.e., the database contains a record of a license), the response can allow the client application to be enabled, or re-enabled. In sum, the client application must be enabled for it to properly operate. Communication between the computer and the licensing server is generally transparent to a user. That is, the client module automatically forms a connection with the license server, sends a message, and receives a response, all without user input or notification.

Alternatively, an exemplary embodiment of the invention can be used to monitor use of client applications. Operation of an exemplary system incorporating the invention for monitoring client application use involves using the client module in the client application to generate messages that are sent to the licensing server. Such messages can be sent over any public network to which a user computer, upon which the client application is loaded, is connected. For example, a message can be sent to the license server in the context of an Internet communication session. The license server tracks, or audits, the use of client applications by recording pertinent information contained in a message generated by a client module. A database can be used to store the information. A software provider or vendor can access recorded information stored in the database to generate client application use reports. Such an auditing system can be a part, or a function of, a system for enabling, validating and/or disabling licensed software (i.e., client applications). When configured as such, audit data can be derived from license inquiry request messages. Furthermore, the license record database in the license server can be used to store the collected audit data. Alternatively, a separate database can be used.

In a personal computer setting, an exemplary process in accordance with the invention may involve utilizing a modem, or like device, in the computer. The client module generates and sends a license validity inquiry request message to a regional or central license server maintained by the software provider. The license server contains an agent module for communicating with the client module and a database containing license records. The database in the license server is checked to see if a valid license record exists for the requesting client application and computer. If so, a message is transmitted back that allows enablement or re-enablement of the client application. The licensing server also can record information corresponding to the request in the database containing the license records, or in a different database.

If a license record is not found, the client application is not enabled. A menu can be presented asking whether the user would like to purchase a license, and thus enable the software. The menu may direct a user to a Web homepage where a license can be purchased, automatically open a session to such a homepage, or provide a telephone number of a sales representative or automated operator. Optionally, the user can initiate a demonstration mode of operation to evaluate the client application.

In a commercial or institutional computer environment (i.e., networked computers), a licensing system in accordance with exemplary embodiments of the invention can involve a hierarchical arrangement of licensing modules arranged between client application(s) and a license server. At the desktop computer level, a client module monitors one, or more, software applications on the desktop computer. Computers, such as file servers, residing at each level of the network, between the desktop computers and the license server, contain licensing modules. Licensing modules include an agent component for communicating with a downstream client, a cache component for interim storage of license information, and a client component for communicating with an upstream agent.

Operation in an exemplary process involves the client module in a desktop computer communicating upstream with an agent component in a licensing module. A client component in that licensing module communicates upstream with an agent component in a next licensing module, whose client component, in turn, communicates with a next upstream agent, and so on. This arrangement is continued upward to converge on a license server which contains an agent module. However, the license server is maintained by the software provider. Consequently, the uppermost licensing module in the institutional network communicates with the license server by initiating a connection over a public network, such as the Internet. License enablement information is supplied to the upper-most licensing module by the license server, which information is propagated back downstream via the licensing modules. The cache components in the licensing modules can be used to store license records so that license inquiries can be addressed without having to forward the validation inquiry request messages to the license server.

In a preferred embodiment of the invention, as applied in a network environment, the client and agent elements are generic. That is, client modules in the desktop computers and client components in each of the network level computers are substantially similar. Agent components in the licensing modules and the agent module in the license server also are substantially similar. The cache components of the licensing modules are used to store information that defines the structure of license records. Any client can communicate with any agent and vice versa. This arrangement facilitates network configuration flexibility.

Operation of an exemplary system incorporating the invention in the network environment involves a client module in a client application forming and communicating a license validity inquiry request message upstream. An agent component in a nearest upstream licensing module receives the request. The licensing module checks its cache to determine if a license record exists corresponding to the request. The licensing module can then respond with an appropriate message. If the license information is not found at that level, the licensing module can forward the request upstream to determine if the license is of record in an upstream cache. This may continue up to the license server. When and if a license record is found, the information is copied into the cache of the licensing module nearest to the computer originating the request for future reference. In accordance with another aspect of systems incorporating the invention, the licensing modules periodically communicate upstream to fetch license information in order to revise and maintain currency of their cached license records. By doing so, a validity request can be addressed by a nearest upstream agent. Furthermore, periodic checking can permit management of request message traffic on the license server.

In accordance with an exemplary embodiment of the invention, license information is organized in class and sub-class designations. License information maintained on the license server covers blocks of underlying computers rather than the individual desktop computers themselves. This provides for efficient communication of license information between the license server, licensing modules, and desktop computers.

Whether used in a personal or commercial computing environment, systems incorporating the present invention allow client software to be enabled or re-enabled at any time without significant delay. Software applications operating in accordance with the present invention can be installed on any computer in the world having access to a public network, such as the Internet. If so desired, a client application can be configured to not operate unless it receives acknowledgment of the presence of a valid license record. As the use of computers expands globally, a licensing system in accordance with the present invention can ensure that a client application operating on any computer in the world is properly licensed.

In addition, in a personal or network computing environment, systems incorporating the present invention can be used to monitor client application use. Such a system can operate by recording information from license validity inquiry requests messages that are received at the license server. Client application use, and corresponding details, can be recorded when the client module sends license inquiry request messages back to the license server.

Alternatively, the system can be used in an audit-only mode whereby the client applications report relevant information back to the license server, but do not require an enabling response message to continue operating. As the use of computers expands globally, a licensing system in accordance with the present invention can assist in tracking client application use and proliferation.

Preferred embodiments of the present invention take advantage of the fact that an increasing number of computers, and computer networks, have direct access to the Internet. Systems in accordance with the present invention can utilize the Internet as the medium over which license validity inquiry request inquiries and their corresponding responses are transmitted.

In accordance with exemplary embodiments of the invention, if a client application does not receive enablement information, the client application is not enabled, or is disabled. Hence, any software application that contains a client module accordance with the invention, can be automatically enabled, or disabled.

Furthermore, use of client module equipped applications can be tracked. Such a system allows software to be freely distributed while ensuring that a license is taken for its use, or at the very least, ensuring that the use of the software can be tracked.

BRIEF DESCRIPTION OF THE DRAWINGS

The foregoing, and other objects, features and advantages of the present invention will be more readily understood upon reading the following detailed description in conjunction with the drawings in which:

FIG. 7 depicts an additional exemplary embodiment of the invention in a portable computer.

DETAILED DESCRIPTION

Figure 1:
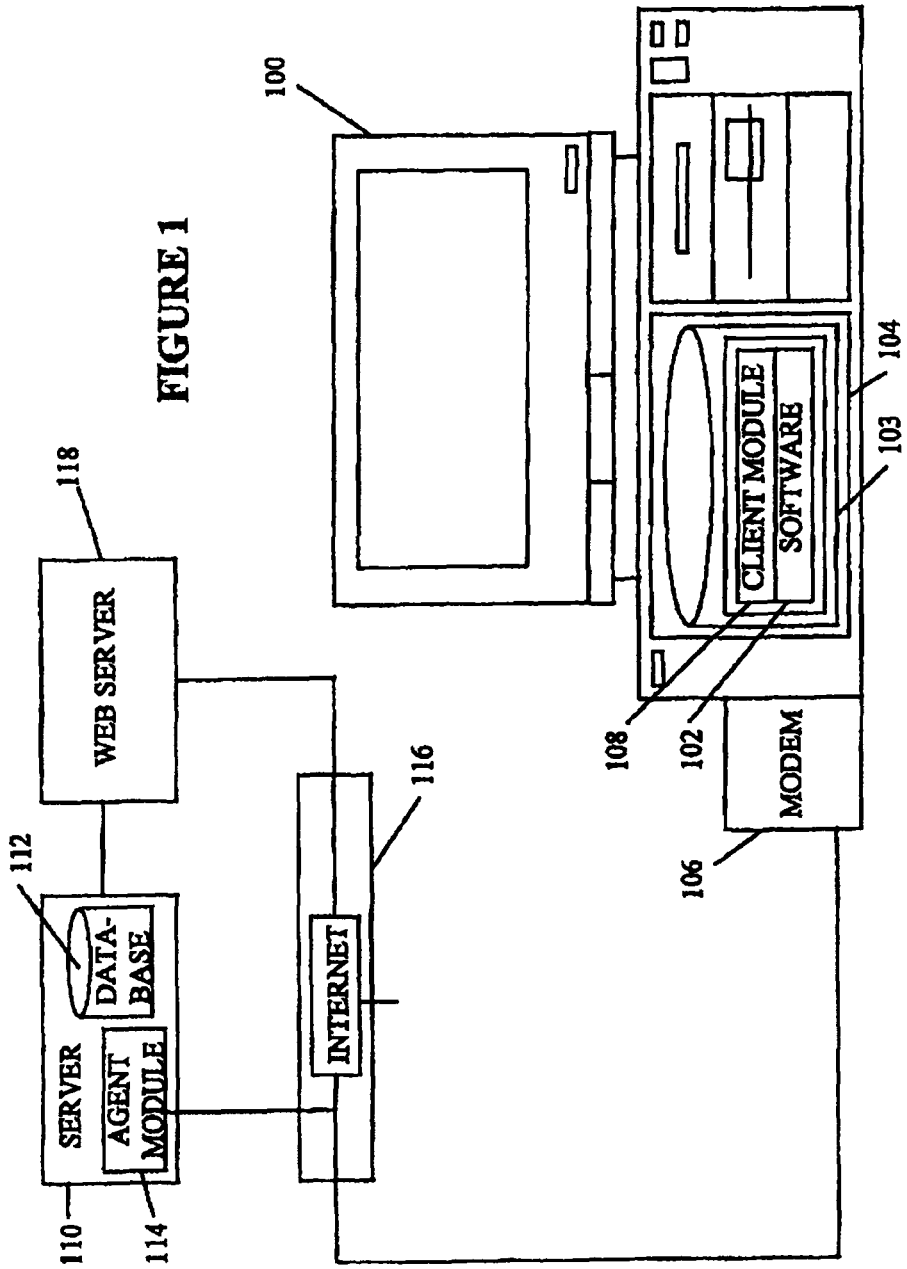
FIG. 1 depicts a desktop computer in accordance with an exemplary embodiment of the invention.

FIG. 1 depicts a personal computer system in accordance with an exemplary embodiment of the invention. The system includes a personal computer 100 that has a client application 103 residing on a hard drive 104. The client application 103 is comprised of a software application 102 and a client module 108. The computer 100 includes a modem 106. The client module 108 operates to enable or disable the software application 102 pursuant to a response from a license server 110 in the context of license validity inquiries. The license server 110 contains a database 112 having license records recorded thereon, and an agent module 114 that communicates with the client module 108. The licensing server 110 is typically maintained by the software provider who developed the software application 102. Alternatively, the license server 110 can be maintained by a contracted service provider. In a preferred embodiment, the client module 108 and the agent module 114 communicate over the Internet 116. However, the client and agent can communicate over any public network. As used herein, the term public network encompasses not only networks that are freely available to the public, generally, but also any private network which can be subscribed to. The depiction of the client module 108 is merely for descriptive and illustrative purposes. The client module 108 can be code nested within the software application 102.

In accordance with an exemplary embodiment of the invention, the client module 108 automatically initiates a process to determine whether the software application 102 is validly licensed. This can happen each time the client application 103 is brought up. The licensing module 108 operates transparently and utilizes the modem 106 to form a connection with the licensing server 110. Once the connection is made, the client module 108 sends a license validity inquiry request message to the license server 110. The agent module 114 receives the request and queries the database 112 to determine whether a license record exists that corresponds to the client application 103 and computer 100. The license server 110 also can record relevant information contained in the license validity inquiry request message to audit the use of client application.

Pursuant to the query, a response message is generated and returned back to the client module 108 by the agent module 114. If the query finds a valid license record, the response message indicates the license record's existence and location in the database 112. The client module 108 can record the license record location for future reference. If a license record is not located in the database 112, an appropriate response message is generated and returned. The presence of a record permits the client module 108 to enable, or to allow continued operation of (i.e., re-enable), the software application 102.

If the query of the database 112 returns an indication that a license does not exist, the client module 108 can pursue any one of many courses of action. The first possible course of action is to not enable the software application 102, or to it if it is presently operating. The client module 108 also may supply an appropriate message to the user indicating that a license does not exist for the client application. Alternatively, the client module 108 can supply a message instructing the user as to where and how a license can be purchased. This may involve directing the user to telephone the software provider's sales department, or the message can direct the user to an appropriate Web site homepage on a Web server 118 where the software can be purchased.

If a license is purchased via a homepage on the Web server 118, the Web server 118 can automatically update the database 112 with the information supplied by the user or the computer 100 (e.g., IP address supplied in the context of a Web session), thereby creating a valid license record. A subsequent client module license inquiry will allow the client application 103 to be enabled. If the license purchase transaction fails for any reason (e.g., a credit card supplied is not approved), the license record can be removed from the database 112 by the software provider. This has the effect of disabling the client application in a next license validity inquiry.

The practical effect of such a system is to be able to provide software that is freely distributable. Any user in possession of the client application 103 will not be able to use it until a license is procured and a license record is established.

Figure 2:
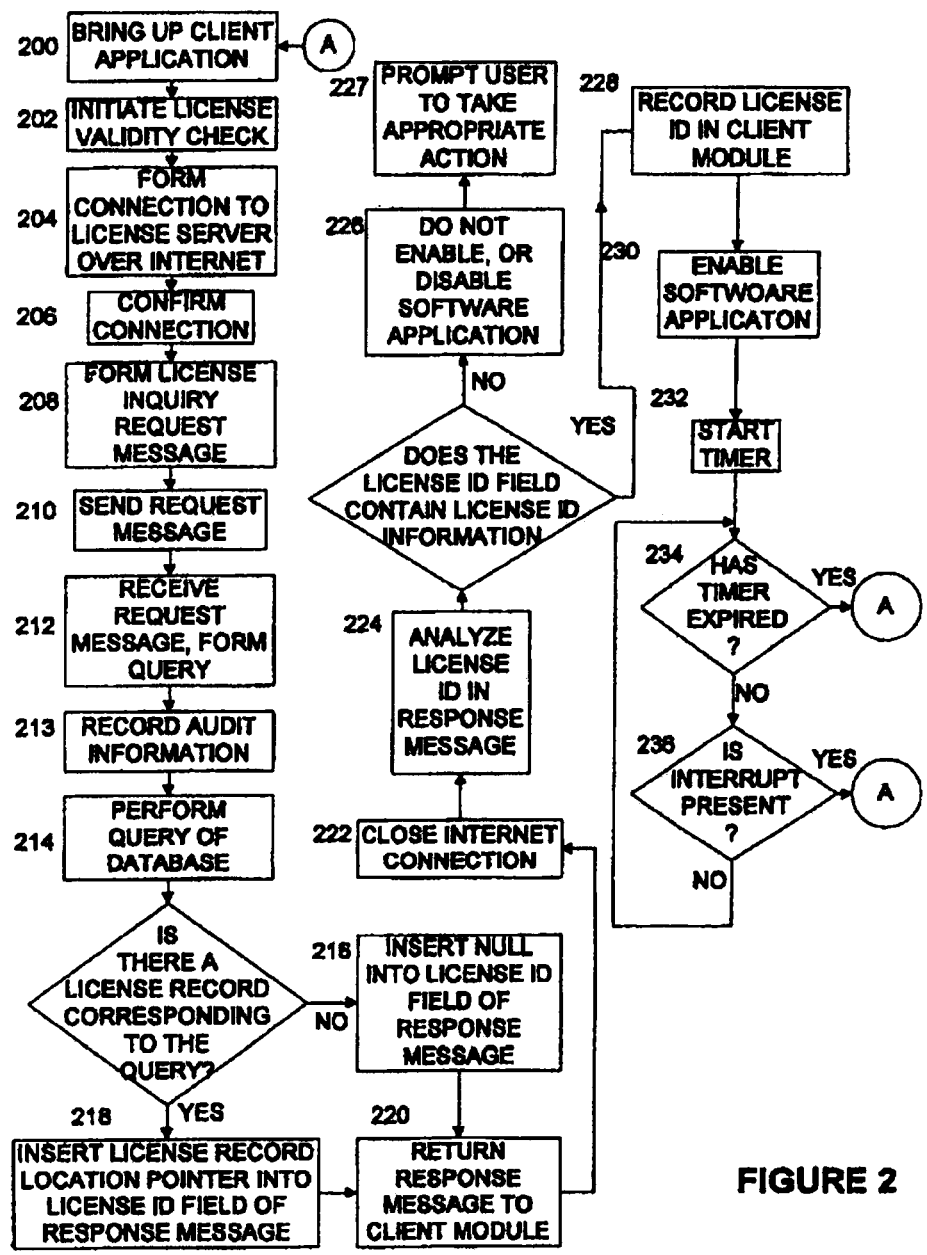
FIG. 2 depicts a flow diagram for operating the arrangement of FIG. 1 in accordance with an exemplary process incorporating the present invention.

An exemplary process of operating the arrangement depicted in FIG. 1 is shown in the flowchart of FIG. 2. The frequency and timing for performing a license validation check can be selected according to the discretion of the software application designer. In the exemplary process depicted, the client module performs an initial check each time the software application is brought up (step 200). The license validity checking process is initiated (step 202) by utilizing a modem to form an Internet connection between the computer 100 and a licensing server (step 204). This may be done by having the client module instruct the modem to dial a 1-800 number maintained by the software provider that accesses a local Internet gateway (if used in the United States).

Once the connection is confirmed (step 206), the client module 103 forms a license validity inquiry request message (step 208). The request message may contain information such as the application name, the application version number, a date/time stamp, the name of a license server 110 (if several license servers are maintained by the software provider), and a hardware identifier, such as the IP address of the computer 100. After formation, the request message is sent to the license server 110 (step 210) over a public network*. The agent module 114 in the license server 110 forms a query (step 212) to determine whether a corresponding license record is stored in the database 112 (step 214). The agent module 114 also can record audit information from the request message (step 213). If the query locates a record of a license for the request, a response message is returned having a license ID field comprising a pointer to the location of the license record in the database 112 (step 218). If the query does not locate a record of a license for the request, a response message is returned having a null indication in the license ID field (step 216). The response message is returned to the client module 108 (step 220) after which the Internet connection is closed (step 222).

The client module 108 investigates the response message to determine whether the license ID field contains a license ID (step 224). If the license ID field is null, the client module 108 fails to enable the software application, or disables it (step 226). The client module 108 may then prompt the user with any variety of messages (step 227). For example, the user may be prompted to assess whether a demonstration period of operation would be acceptable. If so, this information can be recorded in the client module 108 and be passed upstream in the context of a next validity inquiry request message. The server 110 will record this information in the database 112. Alternatively, the user can be prompted to contact a sales representative or automated operator to purchase a license, or directed to a Web homepage where a license for the software application can be purchased. In the event of a license purchase, the database 112 can be automatically updated to record the license. Thereafter, a validity check will find a license record and allow the client application 103 to be enabled.

If the license ID field contains a license ID, this information is recorded by the client module 103 for future use (step 228). The client module 108 then enables the software application 102 (step 230). The client module may, at this point, start a timer (step 232) for periodic checking of license validity. Such a validity check is automatically initiated when the timer expires (step 234). The client module also can be configured to initiate a validity check whenever an interrupt is present indicating a certain activity (step 236), such as printing or saving.

Periodic checks performed at timer expiration, or upon appropriate interrupt, use the license ID, which is a pointer, to directly access the database record corresponding to the license. If the license record is found, a response message indicates so, the software remains enabled, and the timer is reset. If the record is found empty, it may indicate that the license has expired. The response message will indicate this, and the software can be disabled. Alternatively, the user may be requested to renew the license within a certain period of time before the software application 102 is disabled.

The date/time stamp information passed upstream in the license validity inquiry request message can be used to detect whether the system date/time information on the computer 100 has been tampered with. This is done by comparing the date/time information passed in the request message with the date/time information maintained on the licensing server 110. Furthermore, in preferred embodiments of the invention, license ID information is communicated between the client module 108 and the agent module 114 in an encrypted form, as explained in greater detail below.

In the event that no license is found, several response options are available which vary according to the requirements of, and discretion of a designer of the software application 102. As previously mentioned, a response can be to provide the user with a phone number through which a software license can be purchased, or to direct the computer user to a Web homepage maintained by the software provider. Alternatively, the client module 108 can directly initiate a session with the Web server 118 that supports a homepage through which the user can purchase a license. A first screen on such a homepage can prompt the user to indicate whether the purchase of a full license would be desirable, or whether a demonstration period is preferable to evaluate the application. If neither of these options is selected the session is terminated. If the user opts to take a license, the user can be prompted with questions asking which features in the software application are to be enabled (the price of the license can be adjusted accordingly). The session can conclude with the presentation of a payment screen inviting the user to enter credit card information, or to call a sales representative in order to supply payment information.

If credit card information is supplied in the homepage session, it can be gathered using the system disclosed in the U.S. patent application Ser. No. 08/595,956 entitled: "System for Securely Storing Information Received Over a Public Network," by Coley and Wesinger, filed on Feb. 6, 1996, and incorporated herein by reference in its entirety. Once the credit card information is entered, a response message can be sent to the client module 108 temporarily enabling the software application 102. The database 112 can then automatically updated with a license record. If a credit card turns out to be invalid, the license server database 112 can be updated accordingly by removing the license record and thereby disabling the software pursuant to a next inquiry.

The exemplary inventive system described above allows client applications (i.e., software application having client modules) to be freely distributed while reasonably ensuring that they are, or will be, licensed if used. Any software application having a licensing system client module attached will not operate unless and until the license system client module receives authority to enable the software application. Such a system allows global proliferation of the software, even in the form of a copy. However, such widespread use of client applications may result in the license server 110 being inundated with validity request message traffic. A dedicated license server can be set up to handle all of the license inquiry traffic for a particular software application. Alternatively, some form of traffic management can be invoked.

Traffic management can take many forms. It can involve establishing regional license servers according to a geographic arrangement that permits efficient response to any licensing inquiry request messages. A client application initialization process can be used wherein a user enters the location (e.g., zip code, city, and country). This information can be used by the client module to select an appropriate autodial telephone number whereby a nearest software provider license server can be accessed.

Regional license servers can receive license information propagated from a central licensing server. Client modules can contact their regional license server to assess whether license records exist for their corresponding client applications. Because use of the Internet is contemplated as a means for communicating licensing inquiry and response messages, the regional license server designated for a particular client module can be assigned in accordance with efficient network, and/or geographic, considerations. This can facilitate provision of a swift response to license validity inquiry request messages.

Figure 3:
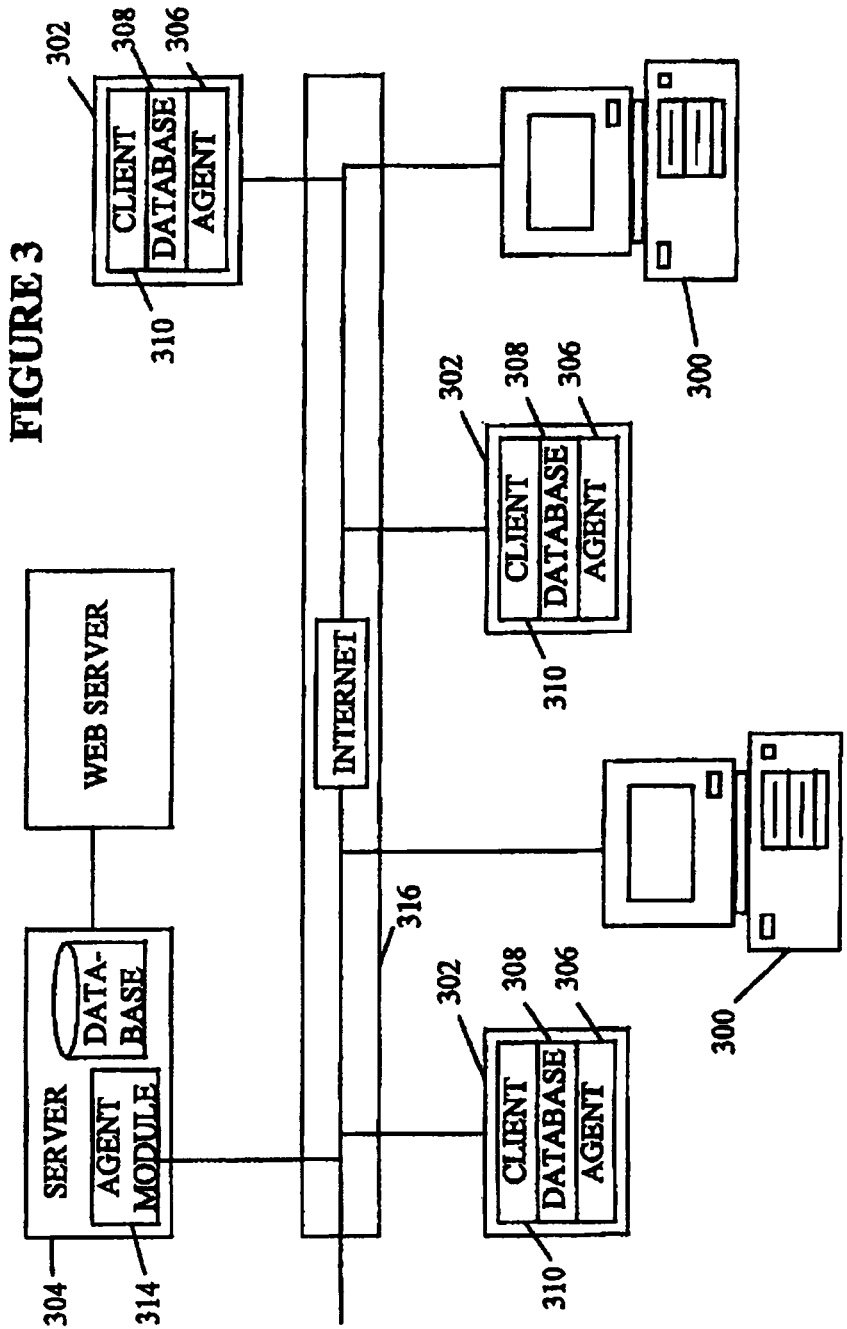
FIG. 3 depicts a regional server scenario in accordance with an exemplary embodiment of the invention.

An arrangement of regional licensing servers in accordance with an exemplary embodiment of the invention is depicted in FIG. 3. Regional licensing servers 302 are comprised of an agent component 306, a database component 308, and a client component 310. A client module in a desktop machine 300 communicates with an agent component 306 in an assigned regional license server 302 over a public access network, such as the Internet 316. The client component 310 in the regional license servers 302 communicates with an agent module 314 in a central license server 304. License information can be systematically directed from the central license server 316 to appropriate regional license servers 302 in accordance with information supplied when the license is procured. Alternatively, the regional license servers 302 can systematically request license record information with which to update their database components 308.

A variation on the regional license servers 302 can be used in a licensing management system incorporating the invention for application in a commercial setting. That is, wherein computers are networked in a hierarchical arrangement within a company or institution.

Figure 4:
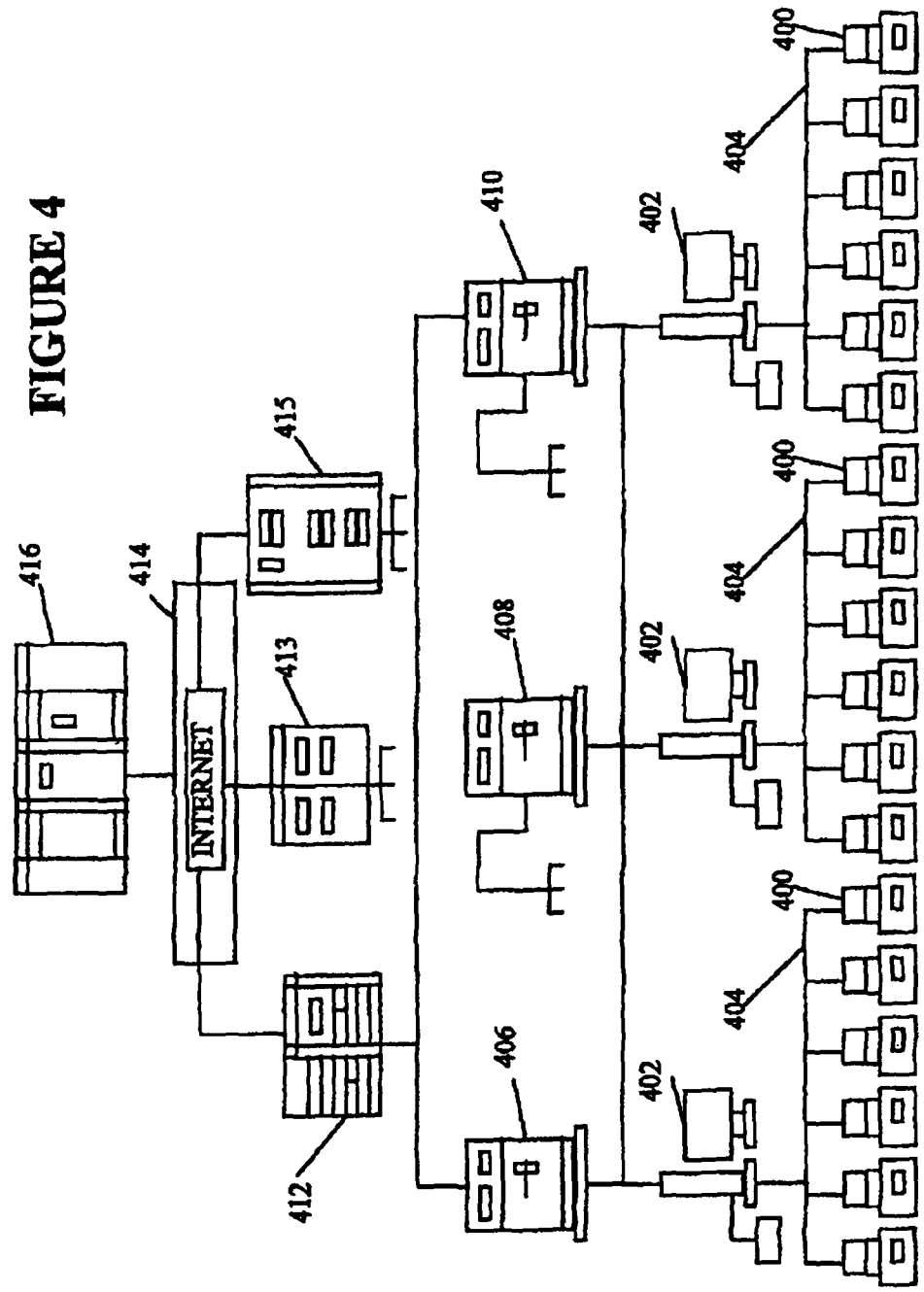
FIG. 4 depicts a computer network arrangement in accordance with an exemplary embodiment of the invention.

FIG. 4 depicts a commercial network system in accordance with an exemplary embodiment of the invention. Desktop machines 400 are organized in file server groups. The file server groups are administered by file server computers 402 through networks 404. The file server groups can, for example, serve various design teams in a research and development facility of a corporation. The file servers 402 in the R&D facility are, in turn, tended by a minicomputer 406. The minicomputer 406, and minicomputers 408 and 410 at other facilities (e.g., manufacturing and sales) are networked under a main computer 412 located, e.g., at the headquarters of the corporation. In accordance with an embodiment of the invention, each desktop computer 400 contains a client module for monitoring one or more client applications. The client modules in the desktop computers 400 communicate upstream with licensing modules contained respective file server computers 402. The licensing modules in the file server computers 402 communicate with a licensing module in the minicomputer 406, which licensing module, in turn, communicates with a licensing module in the main computer 412 at the corporation headquarters. The licensing module in the main computer 412 uses a public network, such as the Internet 414, to communicate with a license server 416 maintained by a software provider who developed the software application(s) on the desktop computers 400. Main computers 413 and 415 at other corporations or institutions also can communicate with the license server 416 to communicate license inquiry and response messages.

Figure 5:
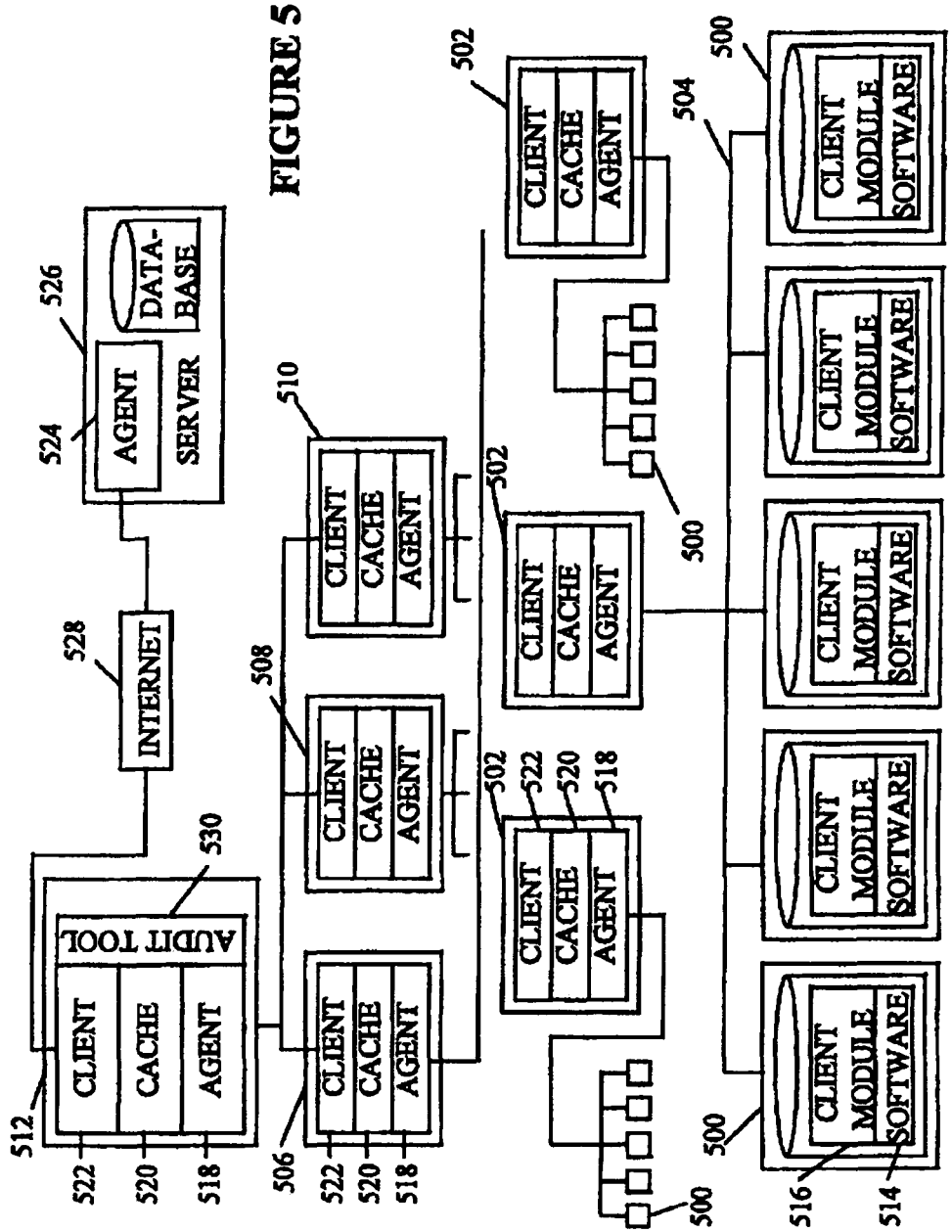
FIG. 5 depicts a symbolic representation of the computer network of FIG. 4.

A representation of the network scenario depicted in FIG. 4, illustrating licensing system components in accordance with an exemplary embodiment of the invention, is shown in FIG. 5. Various network computers are depicted in symbolic form to assist in illustrating the components involved in the exemplary embodiment of the invention. Desktop computers 500 contain software applications 514 having licensing system client modules 516 attached thereto. The desktop computers 500 are tended by group file servers 502 on networks 504. Each of the group file server computers 502, minicomputers 506, 508 and 510, and a main computer 512 contain a licensing module. A licensing module comprises an agent component 518, a cache memory component 520, and a client component 522. The license server 526 maintained by the software provider contains an agent module 524. For any of the licensing modules in the intermediate computers between the desktop computer 500 and the license server 526, the licensing module's client component 522 communicates with the agent component 518 of an upstream licensing module, or with the agent module 524 of the license server. The licensing module's agent component 518 communicates with a downstream licensing module's client component 522, or a client module 516 in a desktop computer 500. Communication between the upper-most licensing module in the internal network (i.e., licensing module 512) and the agent module 524 in the license server 526 is conducted over a public network, such as the Internet 528.

An audit function can be implemented in a networked embodiment of the present invention in a number of ways. For example, the upper-most licensing module 512 can maintain software, such as an audit tool 530, that tracks use of client applications in underlying computers in the network. An audit report can be periodically generated and sent upstream to the license server 526. The license server 526 can record and interpret the audit report to monitor use of client application software. Alternatively, license validity inquiry request message traffic from individual client applications can be recorded in the license server 526. Audit information can be used to generate billing invoices.

An additional aspect of the aforementioned audit system permits an MIS manager at a corporation or institution to monitor the use of client applications for internal audit purposes. Such a system operates by monitoring license inquiry traffic passing through a network to and from a license server. In an exemplary embodiment, such a system involves maintaining internal auditing software (e.g., a tool or utility program) in an upper-most level licensing module in an internal network. A report can be generated by the internal auditing software tool. Data in the report can be derived from information collected at the upper-most licensing module. The MIS manager can use the internal audit reports to manage the licensing arrangements of the client applications on the network. For example, if a network of twenty desktop computers is frequently using a maximum number of floating licenses for a particular client application, the MIS manager can ascertain this by reviewing internal audit records, and take appropriate action.

In accordance with preferred embodiments of the invention in a network setting, each of the agent-type components, and each of the client-type components are generic. That is, any given agent component 518, and the agent module 524 in the license server 526, is substantially similar. The same is true of the client components 522 and the client modules in the desktop computers 500. The parameters maintained by, and passed between various license system elements defines the licensing system structure.

In accordance with a preferred embodiment of the invention, the license system operates by distributing licensing information to the cache components 520 in the licensing modules in response to inquiry requests. The information contained in a particular cache component 520 is specific to subordinate software applications 514, or licensing modules. In accordance with a preferred embodiment, license information is organized by class designations. Individual licenses for client applications on desktop machines 500 can be covered by sub-class licenses maintained in the cache components 520 in the file server computers 502. The sub-class licenses on the file server machines 502 can, in turn, fall under a class license maintained in the cache component 520 of the minicomputer 506. The class license maintained on the minicomputer's licensing module can be designated under a block license maintained in a cache component 520 of the main computer 512. The client component 522 of the main computer's licensing module communicates with the license server 526 to verify block licenses.

Validity inquiry traffic is managed in the exemplary system of FIG. 5 through the use of the aforementioned license class designation structure and through periodic updating of caches in licensing modules. By maintaining license information in a class/sub-class designation, a single license validity inquiry generated by, for example, a file server's licensing module, can enable a sub-class license that covers the client applications of all of the desktop computers 500 in the file server's group. This is generally more efficient than having each desktop computer 500 individually validate its own license through the license server 526. Furthermore, because the sub-class license maintained on the file server itself can fall under a class license maintained on the minicomputer, the validity inquiry by the file server may be addressed by the minicomputer rather than forwarding the request further upstream.

In accordance with a preferred embodiment of the invention, licensing modules periodically and systematically initiate license validity inquiries upstream. The responses to the periodic inquiries are recorded into the cache components of the licensing modules. As a result, client modules and client components need ordinarily communicate with a next upstream agent to be enabled, re-enabled, or to update their caches. Periodic self-validation updating of the licensing modules also provides for more uniform request traffic on the licensing server 526. This can provide efficiencies in propagating license information from the licensing server in response to license validity inquiries. Of course, the foregoing system can operate by passing individual license validity request and response messages through the licensing modules.

The result of the hierarchical arrangement is to control the flow of validity inquiry traffic received and responded to by the licensing server. If a license server dedicated to a particular client application is employed, the license server may be able to handle all of the license inquiry traffic received. However, if a single license server handles license validity inquiry requests for a variety of client applications, request traffic management may be needed. By arranging the system in a hierarchical fashion and designating the licenses in accordance with class and hierarchical subclass designations, the licensing server can manage request traffic for a several different client applications.

Client components and modules contain a set of license management procedures for handling license record information. In accordance with an exemplary embodiment of the invention, three validation procedures are used: Check Out License, Validate License, and Check In License. Check Out License is responsible for the initial enablement of a client application. Validate License is responsible for periodic re-enablement of a client application. Check In License can be used for decrementing a floating license count, or indicating client application status in a database license record when use of a client application is completed. Check In License also may be used for disabling a license or feature after its use in the event that there is a per-use cost associated with the software. The following exemplary process descriptions are provided for a case wherein a client application is validating itself directly, or indirectly (i.e., through one or more licensing modules) over the Internet.

Each of the procedures involves initially forming a connection with a corresponding upstream agent. The agent can be the agent component of a licensing module in an upstream network file server, or like machine containing a licensing module. Or the upstream agent may be the agent module in a license server in which case the connection is formed over a public network, such as the Internet.

When a client application is first brought up, the Check Out License procedure is initiated. The purpose of the Check Out License procedure is to enable the software application to which the client module is attached. In addition, the Check Out License procedure can be used by to track the proliferation of a client application. In accordance with an exemplary process incorporating the invention, the client module's Check Out License call generates a client data structure containing: the name of the software application, any feature name(s) that is to be enabled, the name of the upstream agent component/module, a hardware identifier of the computer containing the client application, a date/time stamp, and a version number of the licensing system. Other fields are created in the client data structure that are filled in by the upstream licensing module or license server.

Prior to, concurrently, or following the formation of the client data structure, the client module forms a connection with the upstream agent component designated in the client data structure. Once the connection is completed, the Check Out License procedure sends a license validity inquiry request message to the upstream agent, which request message contains the contents of the client data structure. Alternatively, the entire data structure can be sent. The information from the client data structure is used by the upstream agent to form a query with which to determine the existence, if any, of a license record for the client application. In the case where the upstream agent is the agent module in the license server, the query is performed on the server database. In the case where the upstream agent is an agent component in a licensing module (e.g., in a file server) the query is performed on the licensing module's cache component.

If the query finds a license record in the database or cache, the location of that record, in the form of a pointer, is generated for storage in a license ID field in the client data structure. The licensing module also generates an authorization ID for storage in a field of the same name in the client data structure. If the query does not locate a license record, the license ID field and authorization ID field are left blank (i.e., nulled). Following the query, a license validity inquiry response message is formed by the agent and returned to the client. The response message contains the license and authorization IDs, if any, that are to be stored in the client data structure.

The client module investigates the client data structure content returned by the agent component/module to analyze the license and authorization ID information contained therein, if any. If these fields indicate the presence of a valid license, the client module enables the software application. The license and authorization IDs are stored in the client data structure in the client module for future license validation checks. If the data structure fields for the license and authorization IDs are null, the client application is not enabled and the client data structure is deleted from the client module.

The database or cache query also may involve a comparison of the date/time stamp contained in the client data structure with date/time information maintained by the license server or license module system. This added security measure can detect a user's tampering with system time and date information on their computer. If the particular software application is operating in a demonstration mode for a predefined period of time, the date/time stamp passed in the client data structure can be used as an initial check of whether the demonstration period has expired. If there is date/time corruption, the client application can be disabled.

In an audit function, the contents of a message generated by the Check Out License procedure can be recorded in the license server or upstream licensing module. Relevant information recorded by the license server can include, but is not limited to, the hardware identifier of the computer upon which the client application is loaded (e.g., the IP address), the application name, feature names, and the application version number. Additionally, a client module registration number, or like identifying means, can be nested in a client application. This registration number also can be passed upstream in a request message for audit recordation. A client module registration number allows a software provider to track the proliferation paths and patterns of copied client applications. Consequently, a software provider can determine the source of copied software. A software provider can force a user to attach a non-connected computer to a network access point by supplying a prompt indicating to the user that a client application will not enable unless and until it checks in. Consequently, if the user chooses to use the client application (i.e., attach the computer to a network access point), the software provider is informed of the client application's use.

A second process initiated by a client module or a client component is the Validate License procedure. This process determines whether a previously enabled client application is still validly licensed. The procedure can be called at any time. For instance, the initiation of the Validate License procedure can be in response to a timer expiration (i.e., a periodic check) or at the appearance of a system interrupt (e.g., printing is selected). The Validate License procedure, in accordance with an exemplary process incorporating the invention, generates a new client data structure containing: the name of the software application, any feature name(s) that is to be enabled, the name of the upstream agent component/module, the license ID, the authorization ID, a date/time stamp, and the version number of the licensing system.

Following completion of the upstream connection, the Validate License procedure sends a license validity inquiry request message to the upstream agent, which request message contains the new client data structure contents. The license ID information in the client data structure is used by the upstream agent to directly access the memory location where the license record was previously located. If the query finds a license record, a new authorization ID is generated by the agent and stored in the authorization ID field in the client data structure. If a license record no longer exists, the license ID field and authorization ID field are nulled. A license validity inquiry response message containing the client data structure is then formed by the agent and returned to the client module.

The client module investigates the data structure contents returned in the response message to analyze license and authorization ID information. If the authorization ID indicates the continued presence of a valid license, the client module allows the client application to remain enabled. The new authorization ID is stored in the client data structure in the client module for future license validation checks or to check in the license. If the data structure fields for the license and authorization IDs are null, the client application is disabled and the client data structure is deleted. Alternatively, the user can be prompted to indicate whether a new license would be desirable. If so, any of the procedures previously described can be used to procure a new license (e.g., access a Web homepage).

The Check In License procedure can be used to return a license or disable a feature when a user has completed use of the client application or a feature contained therein. The procedure, in accordance with an exemplary process incorporating the invention, generates a new client data structure containing: the name of the software application, any feature name(s) that is to be disabled, the name of the upstream agent component/module, the license ID, the authorization ID, a date/time stamp, and the version number of the licensing system.

Following completion of the upstream connection, the Check In License procedure sends a license check in request message to the upstream agent, which request message contains the new client data structure contents. The license ID information in the client data structure is used by the upstream agent to directly access the memory location where the license record was previously located. The existing license record is modified to indicate the disablement of a feature, or is deleted (if the agent is the agent module in the license server). If the agent is an agent component in a licensing module, the license is designated for deletion. This information is passed upstream in a license check in request message subsequently sent up stream by the licensing module in its next periodic self-validation. The license and authorization ID fields of the client data structure are nulled, and a license check in response message containing the client data structure is then formed by the agent and returned to the client module. The client module then deletes the client data structure.

It is important to note that, in a network setting incorporating the aforementioned exemplary processes, the client components of the licensing modules also can use the Check Out, Check In, and Validate License procedures to update licensing records stored in their cache components. Performance of these procedures by the licensing modules is substantially similar to performance of the procedures by a client module. However, the corresponding license ID, instead of referring to an individual client application, can refer to a class or subclass license that covers a block of underlying client applications, or licensing modules. As previously mentioned, the Validate License procedure can be periodically initiated by the licensing modules to systematically update the contents of their caches and to provide for request traffic management received at the license server.

Automatically auditing cached license records improves the likelihood of a client application, or client component, finding a current license record in a next upstream agent in the context of a Check Out or Validate License procedure.

A licensing system in accordance with the invention, in a preferred embodiment, involves inserting licensing system code into a pre-compiled version of a software application and then compiling that application into a single executable client application.

However, in accordance with another embodiment of the invention, the licensing system can be provided as a module that is inserted into to an existing software structure on a computer network. Such a system can be used to monitor software application use in a computer network that does not otherwise have a means to audit application use. This type of system can be used by individuals, such as MIS managers, who wish to audit software application use activity in a network. In an exemplary embodiment, a client module installed in an individual desktop computer "wraps around" software applications selected for monitoring. When the wrapped application used, or seeks a floating license from a file server, a licensing module installed in the file server computer records the activity. In a floating license system, the licensing module can be configured to always reserve a license for use by certain individual computers (e.g., the CEO's computer). Audit records generated by the licensing module can be periodically checked by the MIS manager to see if adjustments are needed (e.g., purchase a greater number of floating licenses).

A variation of the latter system also can be installed in existing network to retrofit a licensing management system. Client modules wrap previously installed applications thereby converting them into client applications. The client modules on individual computers monitor and/or control client application use. The client modules can report to licensing modules in upstream file servers, or report directly to a license server over a public network. Such a system can be used by software providers as an aftermarket component installed on top of existing software systems. In such a setting, a client module can be responsible for handling license validation of more than one client application loaded on the computer. If two or more client software applications on a computer are by a same software provider, the client module can generate a single validity request message covering each wrapped client application. Such a system has the effect of providing a generic licensing validation system for all of the licensed software on a desktop machine supplied by a particular software provider.

Figure 6:
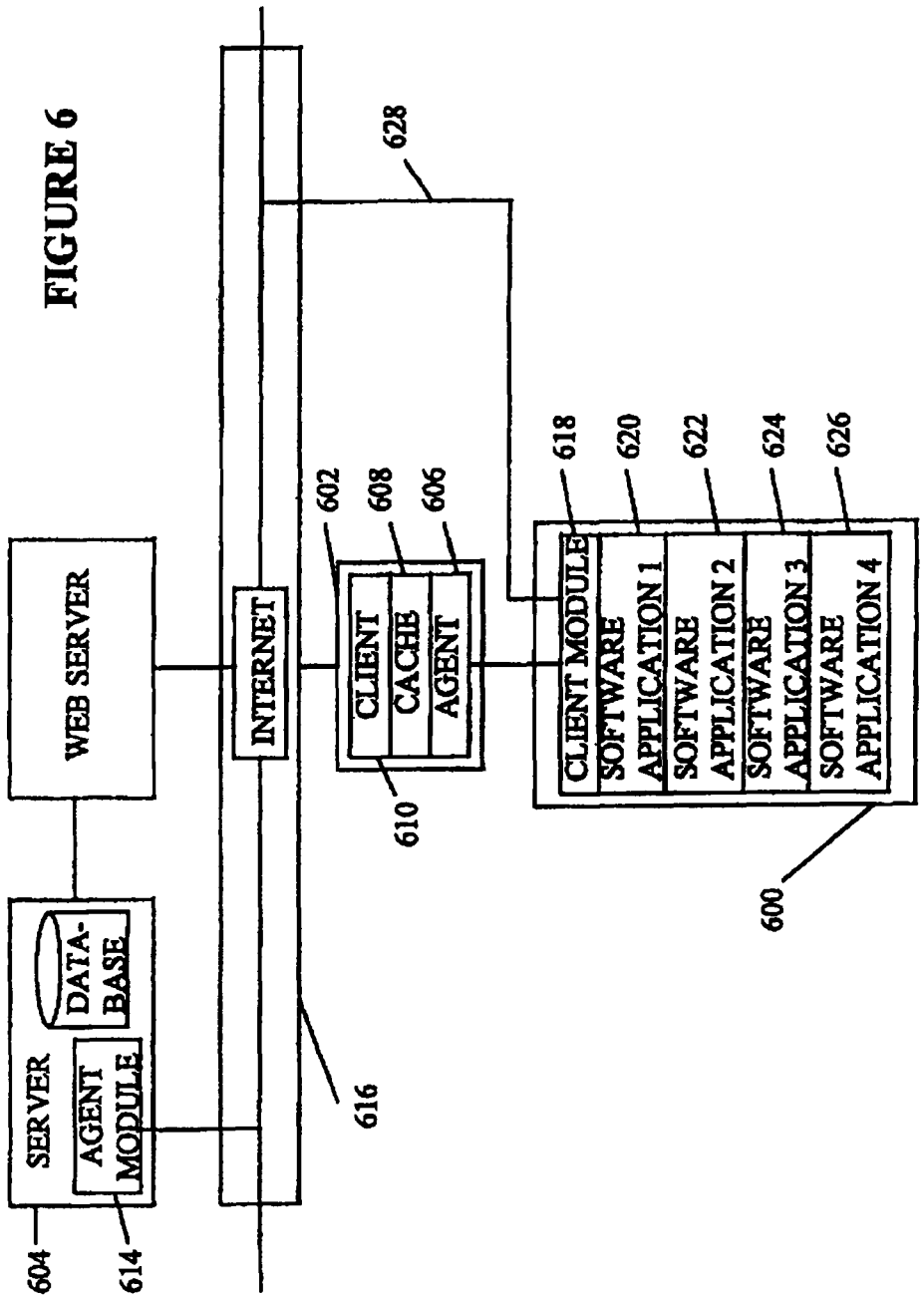
FIG. 6 depicts an additional exemplary embodiment of the invention wherein multiple software application licenses are managed.

An exemplary licensing system that can be retrofitted in an existing computer network is depicted in FIG. 6. An individual computer 600 has a client module 618 installed therein. The client module 618 is wrapped around one or more software applications 620, 622, 624 and 626 to create client applications. In a preferred embodiment, the client applications are specific to the software provider who is retrofitting their networked software with the licensing system. However, if a license record database is configured as a "clearing house," whereby a multitude of software providers consolidate license information in a single server or a network of license servers, the client module 618 can validate software licenses by a variety of software providers. The client module 618 can enable, or validate, the client applications by communicating with a licensing module in a file server 602. The licensing module in the file server 602 also is a retrofitted component in the license system. Licensing modules are installed in each of the computers (e.g., file servers, minicomputer, main computers) that form the network hierarchy. Operation of such a system is substantially similar to that of a network embodiment of a license management system described above. Alternatively, client modules can communicate directly with a license server 604 over a public network, such as the Internet 616.

As mentioned in the Background above, software licensing management systems conventionally maintain proprietary, that is application specific, licensing code in software applications (i.e., application portion). Corresponding proprietary licensing code also is maintained in the file server or like network element (i.e., authenticator portion). Consequently, a conventional system typically has to maintain several separate licensing validation programs on a file server to check each of the software applications loaded on sub-tended computers. A system in accordance with the latter embodiment of the invention provides for a generic solution whereby a single client module is maintained on the desktop computer that handles all of the licensing management for the computer's client applications. Hence, the computers and corresponding servers need not contain several licensing system applications each having proprietary code.

Because the exemplary embodiments described above describe use of the Internet as a communications medium, the hardware identifier maintained in the client data structure is preferably the IP address of a computer. However, any other suitable hardware identifier can be used to identify the computer on which a client application or licensing module is loaded. For example, Intel's Pentium.RTM.processor contains an internal serial number that can be used as a hardware identifier. Alternatively, a hardware module can be provided that is designed specifically for a licensing system in accordance with the present invention. Such a hardware module can be attached to a parallel port on a computer can be used as a tag to identify the computer. The client module in the computer scans the parallel port to acquire the computer's hardware ID for insertion into a client data structure.

The license ID maintained in the client data structure is used as a pointer to a location in the cache or database of a corresponding upstream licensing agent or server. The pointer designates the location of the licensing record. A license record at any given level can represent a relationship between the agent and an underlying client. That relationship, as designated by the license ID can be used as a universal designator to replace designating a particular client/agent pair by application name, feature name, IP address, agent name, etc. Use of a license ID provides a more efficient means with which to track and communicate information regarding a particular license.

The authorization ID is used as a means to indicate the status of a license in response to an enablement or validation inquiry. The authorization ID also can be used as an acknowledgement to a Check In License procedure that permits a client application to delete a client data structure. Furthermore, the authorization ID also can be used to return a status message containing an error code, an indication that the server or agent is presently too busy to handle a query, an indication of a connection or communication failure, or any other like message. Another important task facilitated by the authorization ID is its use in supporting encrypted communication between a client and an agent.

Communication between clients and agents, in accordance with preferred embodiments of the invention, is encrypted. In an encryption scheme according to an exemplary embodiment, the authorization ID is used to pass back a key for use in encryption processing. The encryption scheme involves maintaining identical encryption engines in corresponding clients and agents. The key passed by the authorization ID is used as a common seed, or initialization vector, for initializing the respective encryption engines for encryption and decryption of messages. A new key is generated and passed back each time an agent responds to a client inquiry, which key is used in a next round of communications. The key is stored in the client module in the context of storing the client data structure (containing the authorization ID). In a subsequent client-to-agent communication the key is used for client encryption of a message. The message is then decrypted at the agent using the common key.

In order to allow encryption synchronization, all of the data structure fields in an initial communication between a client/agent pair are unencrypted. Subsequent communications have certain fields encrypted. In response to an initial communication, the agent passes back a first key. The message is then re-sent having designated fields of the client data structure encrypted. The response passed back by the agent in a next communication contains a new key for use in a subsequent communication. In this way, the client and agent maintain encryption synchronization by supplying the same key to their respective encryption engines. In accordance with a preferred embodiment, the key is a random number generated by an agent.

The encrypted fields of the data structure contents passing between a client and agent include the license and authorization Ids, and any proprietary data required for validation, such as floating license information. All of the fields of the data structure contents can be encoded, however, the application name, feature name, hardware identifier, and a licensing system version number are preferably left unencoded. In the event that there is lack in synchronization, a client or agent can look to the unencoded information and revert back to a most recent encryption key. If there is still lack of synchronization, a request is passed that the client return to the initial message state, thereby allowing both the client and agent encryption engines to reset.

The frequency of validation checks is application dependent. A software designer can select when and how often validation checks are to occur, if at all. The licensing system can be configured in accordance with the needs of a particular application. The software license can be validated, or enabled, each time the application is brought up on a computer, or each time a particular feature is used (e.g., printing). The software license also can be validated in response to the expiration of a timer (i.e., periodic validation). If the response to the validation check is returns a null license ID, the client application is disabled. To prevent a user from tampering with a client application, or a licensing module associated therewith, in an effort to disable validation checking, any number of watchdog timers can be nested in the client application. The nested watchdog timer can be used to periodically self-check the client application to determine whether it has been validated within the watchdog period. If so, the watchdog timer is reset. If not, a validation check can be initiated or the client application can be disabled.

Establishing a database license record in the licensing server can be performed in a variety of ways. Software can be purchased and paid for in an interactive commercial transaction conducted over the Internet, as described above. The result of such a transaction is to establish a license record in the licensing server database. A subsequent validation check by the client application will allow the software to be enabled. The database entry also can be formed by pre-authorization. If the software is purchased from a vendor, the vendor, in the context of the transaction can perform the database entry shortly after the software is supplied to the user or company. When the software is brought up on the client computer, an initial validity check will return an enablement response because a license record has already been established.

Alternatively, software can be pre-enabled with a temporary term license thereby providing a software provider with a time window in which to establish a license record. Other techniques for establishing an entry in the database, and thus enabling the corresponding client application, include using automated telephone operator systems. A client can call a telephone number and use a touch-tone phone to respond to prompts presented by an automated operator. Hence, any mechanism for initializing the database, and consequently automatically enabling the software, is deemed suitable.

Another aspect of systems operating in accordance with the invention is feature enablement. The systems described above can be used to enable and disable particular features in a client application. Such a situation may occur wherein a software application has several levels of operating capability. For instance, a user can selectively enhance operating capability by selecting features defined in a software feature application menu. In response, an associated client module can invoke the Check Out License procedure wherein the desired feature name is passed upstream. The license, of course, does not exist yet, but the system can be configured to direct the user to, or provide the user with, a feature enablement menu that requests that the user enter credit card information, as described above. Alternatively, the system can be organized to automatically initiate a process that creates a license when new software is brought up. This can involve a mechanism that forms a Web server connection and supplies an authorization message that creates a database license entry. For a commercial client, a software provider can monitor the activation and use of client application features and bill the client accordingly.

As previously discussed, systems in accordance with the present invention can be used to audit the use and proliferation of software. Attachment of a licensing module to a software application causes that software application to report back to a licensing server at some point. If the client module or software application is configured to report back the first time that the software application is brought up, a software provider can keep track of, or audit, which and how many machines the software application is operating on. The licensing server can be set to initially enable any request received for the software application being audited. At the discretion of the software provider, the software application can be turned off at anytime. The software provider can respond to subsequent licensing enablement or validation requests by supplying a prompt inviting the user to purchase a license. A variation on the audit function can be used to log questionable user activity.

An additional security aspect of systems in accordance with the invention is the provision of an activities log in the client module, licensing modules, or license server. Such a log gathers information associated with any or all validation requests, or irregularities. Information gathered in such a log may include, but is not limited to, data/time stamps (to ensure periodic checking is not interfered with), and the identity of a machine corresponding to the origin of an inquiry request. The foregoing information can be used to facilitate the investigation of a pirate if the pirate's activities require legal attention.

Software version control can be provided in accordance with another aspect of the invention. Software version number information can be passed upstream in the context of a license validity inquiry request message. If the software version has expired, a message can be passed back in the status field of the authorization ID indicating this information to a user. The user may then be asked to license and procure a new version of the software. Software version control can be used to prevent version collision, and to force users to stop using expired software versions by simply disabling them.

Another aspect of the invention is license system version control. By monitoring and controlling the version of the license system that is operating, a common denominator between client and agent communications can be maintained. Alternatively, in the event that different versions are allowed, appropriate translations of data fields can be made to ensure the different versions can still communicate. In a preferred embodiment, a given client can only communicate with an agent of the same or newer version. Licensing system version control also permits modifications to be made to improve, enhance, or entirely change an encryption schemes used by the licensing system.

The present invention also can be used to maintain a software use billing system for use with commercial client applications. A billing system in accordance with the invention can use client application and feature use information from the audit system. The audit system information can be translated into billing statements. Consequently, a commercial client can optionally be billed only for what they have used, rather than a set up-front, annual, or monthly amount.

Most computers sold today have pre-installed modems. Individual desktop machines operating in a DOS, Windows, OS/2, or like environment, can utilize their pre-installed, or aftermarket modems to initiate communications with an upstream agent or license server. Most commercial computers are designed for incorporation into network settings. Commercial computing systems, such as workstations, may operate in a UNIX environment. The UNIX environment is well suited to operation in accordance with the invention. Most UNIX workstations are furnished with network cards permitting them to be network connected. Such networked computers thus have ready direct access to Internet or gateway nodes through which a license server or licensing module can be accessed.

The particular connectivity associated with a system incorporating the invention is not critical. For example, a desktop machine can contain an Ethernet network card, ISDN connection card, Internet card, conventional modem, terminal adapter, or like device, with which to gain access to and communicate with a license server or licensing module. Any accepted form of connection between two more computers can be used. A communications protocol in an Internet environment is based on a TCP/IP protocol, or a derivative thereof. However use of other communication protocols such as IPX/SPX (NOVEL), or like protocols, also are suitable for facilitation of communication in the present invention.

When using the Internet, the medium through which to check license validity, preferred embodiments of systems according to the invention operate using a TCP (Transfer Control Protocol) mechanism rather than a UDP (Universal Datagram Protocol) mechanism. In a TCP communication, a connection is first formed before any information is transferred. That is, an interactive two-way session is established. In a UDP communication, a message is sent without forming a connection. The message is routed in accordance with its destination address information. The message's receipt is not guaranteed. More importantly, response time to a messages sent by UDP is unknown. More specifically, if heavy network traffic is present, a UDP-based message may be delayed. Consequently, there can be an unacceptable delay in enabling a client application. Using a TCP messaging format guarantees a response, even if that response indicates that a connection cannot be made. A decision can be made whether to re-attempt communication immediately or at a later time. A TCP connection also is more secure because data is not being cast into the network without guarantee of receipt, as is the case with UDP communications.

One scenario where UDP communication can be utilized is in an audit system incorporating the invention. A client application can generate and send a UDP message when it is initially brought up, or whenever a computer upon which the client application is loaded is attached to a public network.

In a non-connected or portable computer, such as a laptop, an exemplary licensing system in accordance with the invention can involve running an internal licensing module, or an agent component thereof, on the laptop computer itself. An exemplary embodiment of such an arrangement is depicted in FIG. 7. The agent component 706 of the licensing module 702 acts on behalf of a license server 712 during the periods that the portable computer 700 is out of communication with the license server 712. The agent component 706 can receive and respond to license validity inquiries generated by a client module 704 on software application 705 that is loaded on the portable 700 while the portable 700 is in transit. Audits of client application use can be stored in the cache 708 of the licensing module 702. When the portable 700 is re-connected to a network access point, such as an Internet 716 gateway, the client component 710 of the licensing module 702 can establish communication with the agent module 714 in the license server 712 to refresh the information in its cache component 708 and/or supply any audit data upstream. If the user has not connected the laptop to a network access point for a prolonged period of time, the user can be prompted accordingly. This can be done pursuant to the expiration of a timer.

Systems not having network, or Internet access, can still be enabled in an automated, albeit semi-manual fashion. The licensing module in a software package to run on a non-networked machine can contain a tag indicating this fact. The user may be prompted to call a number and receive recorded information for enabling the software. This information, of course, requires initial manual entry to enable the software, and periodic manual entry to validate the software. The validation check can be performed by prompting a user to call a number to automatically receive further enablement instructions. Such instructions are only provided if the license remains valid. Optionally, instructions can be automatically be returned by fax in response to a validation request phone call.

A licensing module can be operated as a proxy agent on a firewall separating a protected computer from a public network to which the computer is attached. Such a firewall proxy agent can operate in accordance with the system disclosed in the U.S. patent application Ser. No. 08/595,957, entitled: "Firewall System For Protecting Network Elements Connected To A Public Network," by Coley and Wesinger, filed on Feb. 6, 1996, and incorporated herein by reference in its entirety. The foregoing application describes a system for preventing unauthorized access to network elements protected by a firewall. The firewall operates by maintaining a plurality of proxy agents that are assigned to verify and connect any incoming access requests. A proxy agent is usually assigned based on the port number associated with an incoming access request. In the present case, however, a proxy agent for validating a license is assigned for a request originating from a desktop machine that resides behind the firewall (i.e., is protected by the firewall). Hence, the proxy agent acts as licensing module performing all of the previously described tasks associated with licensing modules. For example, a proxy agent licensing module can receive and forward a license validity inquiry request message from a client application residing on a protected computer. The proxy agent also acts on behalf of the responding agent to accept a inquiry response message and then pass the response back to the protected computer on behalf of the responding agent. The proxy agent also can facilitate periodic updates of a cache component maintained therein. The proxy agent is the only IP address visible outside of the firewall. The foregoing system protects the identity of the client application computer because the proxy agent acts on behalf of the computer when communicating with the outside world.

In an exemplary commercial embodiment, the present invention can take the form of a software package comprised of floppy disks, a CD-ROM, or even a downloadable package. The software package may consist of a library of object modules that can be selected, as needed, by a software applications designer. The designer may select various object modules from the library for insertion into a pre-compiled version of a software application. The entire software application, including the selected object modules, are compiled to create a single executable client application. The selection of insertion points and frequency is left to the discretion of the designer. Validation check watchdog timers can be distributed throughout a software application. Validation checks can be inserted to correspond to various interrupts, or procedure calls within the software application (e.g., printing, saving). An opening routine in the software application can be selected for insertion of an initial license validation or enablement check.

Because the present invention involves the operation of computing systems, an exemplary embodiment of the invention can take the form of a medium for controlling such computing systems. Hence, the invention can be embodied in the form of an article of manufacture as a machine readable medium such as floppy disk, computer tape, hard drive disk, CD ROM, RAM, or any other suitable memory medium. The invention can also be embodied in a form that can be accessed and retrieved over a public network, such as the Internet, and downloaded onto a machine readable memory medium. Embodied as such, the memory medium contains computer readable program code which causes one or more computing systems upon which the licensing system is running to function or carry out processes in accordance with the present invention.

The invention has been described with respect to several exemplary embodiments. However, one skilled in the art will readily appreciate and recognize that the licensing system or method of operation in accordance with the invention can be applied in any computing system using licensed software, which systems are preferably attachable to a public network, such as the Internet. The invention provides the benefit of being able to freely distribute licensed software incorporating the invention with reduced apprehension of the software being illicitly copied or used without its being properly licensed. Alternatively, a system in accordance with the invention can be used to track and maintain records of the proliferation and use of software incorporating the invention.

The invention has been described with reference to particular embodiments. However, it will be readily apparent to those skilled in the art that it is possible to embody the invention in specific forms other than those of the embodiments described above. Embodiment of the invention in ways not specifically described may be done without departing from the spirit of the invention.

Therefore, the preferred embodiments described herein are merely illustrative and should not be considered restrictive in any way.

The scope of the invention is given by the appended claims, rather than by the preceding description, and all variations and equivalents which fall within the range of the claims are intended to be embraced therein.

What is claimed is:

1. A method for synchronous encryption between a client module and a licensing agent component comprising:
    initiating, by a client module, a connection directly with a licensing agent component;
    sending, by said client module, an unencrypted data structure in an initial communication to said licensing agent component, the licensing agent component sending by the licensing component a first key to said client module responsive to the initial communication;
    initializing, in both said client module and said licensing agent component, encryption engines using said first key;
    designating by said client module fields of said unencrypted data structure and encrypting said fields according to said first key, resulting in a partially-encrypted data structure;
    resending, by said client module, said partially-encrypted data structure to said licensing agent component; and
    sending, by said license agent component, a second key to said client module.

2. The method of claim 1, wherein said client module and licensing agent component maintain encryption synchronization by supplying the same key to their respective encryption engines.

3. The method of claim 1, further comprising the act of returning said client to an initial message state in the event of a lack of synchronization in keys between said licensing agent component/client module pair.

4. An article of manufacture comprising a non-transitory machine-readable memory medium, said memory medium comprising computer-readable program code, that when executed by a computing system causes the computing system to perform a method of maintaining synchronous encryption between a client module and a licensing agent component, said method comprising:
    initiating, by a client module, a connection directly with a licensing agent component;
    sending, by said client module, an unencrypted data structure in an initial communication to said licensing agent component, the licensing agent component sending by the licensing component a first key to said client module responsive to the initial communication;
    initializing, in both said client module and said licensing agent component, encryption engines using said first key;
    designating by said client module fields of said unencrypted data structure and encrypting said fields according to said first key, resulting in a partially-encrypted data structure;
    resending, by said client module, said partially-encrypted data structure to said licensing agent component; and
    sending, by said license agent component, a second key to said client module.

5. The article of claim 4, further comprising the act of returning said client to an initial message state in the event of a lack of synchronization in keys between said licensing agent component/client module pair.

6. The article of claim 4, wherein said client module and licensing agent component maintain encryption synchronization by supplying the same key to their respective encryption engines.

* * * * *